US00RE36181E

United States Patent [19]

Koopman, Jr. et al.

[11] E Patent Number: Re. 36,181

[45] Reissued Date of Patent: Apr. 6, 1999

[54] PSEUDORANDOM NUMBER GENERATION AND CRYTOGRAPHIC AUTHENTICATION

[75] Inventors: Philip J. Koopman, Jr., Pittsburgh, Pa.; Alan M. Finn, Amston, Conn.

[73] Assignee: United Technologies Automotive, Inc., Dearborn, Mich.

[21] Appl. No.: 751,932

[22] Filed: Nov. 8, 1996

Related U.S. Patent Documents

Reissue of:

[64] Patent No.: 5,363,448
Issued: Nov. 8, 1994
Appl. No.: 86,080
Filed: Jun. 30, 1993

[51] Int. Cl.[6] ..... H04L 9/32

[52] U.S. Cl. ..... 380/23; 380/21; 380/25; 380/43; 380/49; 340/825.31; 340/825.34

[58] Field of Search ..... 380/4, 9, 23, 24, 380/25, 46, 49, 50, 21, 43; 331/78; 364/717, 717.01, 717.02, 717.03, 717.04, 717.05, 717.06, 717.07; 340/825.31, 825.34

[56] References Cited

U.S. PATENT DOCUMENTS

| | | |
|---|---|---|
| Re. 33,189 | 3/1990 | Lee et al. . |
| 3,622,991 | 11/1971 | Lehrer et al. . |
| 3,654,604 | 4/1972 | Crafton . |
| 3,665,162 | 5/1972 | Yamamoto et al. . |
| 4,133,974 | 1/1979 | Morgan . |

(List continued on next page.)

FOREIGN PATENT DOCUMENTS

| | | |
|---|---|---|
| 0304733 | 5/1993 | European Pat. Off. . |
| 3 225 754 | 1/1984 | Germany . |
| 2144564 | 7/1984 | United Kingdom . |

OTHER PUBLICATIONS

National Semiconductor Corporation Inc.'s Response to United Technologies Automotive, Inc.'s First Set of Interrogatories (dated Sep. 2, 1997).

Correspondence letters from Robert P. Greenspoon to Audrey Sugimura dated Feb. 2, 1998 and Feb. 3, 1998.

"Integrated Circuit Compatible Random Number Generator," IBM Technical Disclosure Bulletin, vol. 30, No. 11, Apr. 1988, pp. 333–335.

Peterson et al, *Error–Correcting Codes*, MIT Press, 2ed., 1972.

Michelson et al, *Error–Control Techniques For Digital Communication*, John Wiley & Sons, 1985.

Petrovic, Branislav, "A Balanced RF Oscillator", rf design awards, no date.

(List continued on next page.)

*Primary Examiner*—Bernarr E. Gregory
*Attorney, Agent, or Firm*—Niro, Scavone, Haller & Niro

[57] ABSTRACT

An automobile door lock receiver module (30) and a plurality of keychain fob transmitter units (16) contain identification numbers, secret initial values, and secret feedback masks so as to authenticate encrypted messages from any of the assigned fobs, indicative of commands registered by closing switches on the fob. Each fob is synchronized with the receiving module by means of a truly random number concatenated with a secret initial value and encrypted, through a linear feedback shift register or other operations. A second secret initial value is encrypted and command bits are exclusive ORed into the low order bit positions; the two encrypted numbers are concatenated and encrypted to form a key word which is transmitted with the fob ID. Synchronization includes decrypting to recover the truly random number and the secret initial value concatenated therewith; the truly random number is compared with previously received random numbers in order to avoid copying of recently transmitted synchronization commands. Successive lock-related commands utilize the number encrypted from the truly random number and the second secret initial value as starting values, employing a pseudorandom number of encryption iterations. A half-second delay between responses mitigates gaining access through numerical trials. An authenticated panic alarm command operates the headlights and horn of the vehicle but does not alter the synchronization.

93 Claims, 9 Drawing Sheets

U.S. PATENT DOCUMENTS

| | | | |
|---|---|---|---|
| 4,319,273 | 3/1982 | Nossem . | |
| 4,322,577 | 3/1982 | Brandstrom . | |
| 4,418,275 | 11/1983 | Oosterbaan et al. . | |
| 4,424,414 | 1/1984 | Hellman et al. | 380/30 |
| 4,435,826 | 3/1984 | Matsui . | |
| 4,509,093 | 4/1985 | Stellberger . | |
| 4,595,985 | 6/1986 | Sakakiya . | |
| 4,596,985 | 6/1986 | Bongard et al. . | |
| 4,612,413 | 9/1986 | Robert et al. . | |
| 4,613,980 | 9/1986 | Newlin et al. . | |
| 4,630,201 | 12/1986 | White . | |
| 4,654,480 | 3/1987 | Weiss . | |
| 4,667,301 | 5/1987 | Chiu et al. | 364/717 |
| 4,691,291 | 9/1987 | Wolfram | 364/717 |
| 4,733,215 | 3/1988 | Memmola . | |
| 4,734,680 | 3/1988 | Gehman et al. . | |
| 4,736,419 | 4/1988 | Roe . | |
| 4,758,835 | 7/1988 | Rathmann et al. . | |
| 4,771,463 | 9/1988 | Beeman . | |
| 4,797,921 | 1/1989 | Shiraishi . | |
| 4,800,590 | 1/1989 | Vaughan . | |
| 4,825,210 | 4/1989 | Bachhuber et al. . | |
| 4,847,614 | 7/1989 | Keller . | |
| 4,853,884 | 8/1989 | Brown et al. . | |
| 4,853,962 | 8/1989 | Brockman . | |
| 4,870,682 | 9/1989 | Morrey et al. . | |
| 4,876,718 | 10/1989 | Citta et al. | 380/21 X |
| 4,881,148 | 11/1989 | Lambropoulos et al. . | |
| 4,892,098 | 1/1990 | Sauer . | |
| 4,905,176 | 2/1990 | Schulz . | |
| 4,912,463 | 3/1990 | Li . | |
| 4,928,098 | 5/1990 | Dannhaeuser . | |
| 4,942,393 | 7/1990 | Waraksa et al. . | |
| 4,980,108 | 12/1990 | Suzuki et al. . | |
| 5,001,754 | 3/1991 | Deffeyes | 380/46 |
| 5,007,016 | 4/1991 | Le Méhauté et al. | 380/46 X |
| 5,048,086 | 9/1991 | Bianco et al. | 380/46 X |
| 5,054,067 | 10/1991 | Moroney et al. . | |
| 5,055,701 | 10/1991 | Takeuchi . | |
| 5,060,265 | 10/1991 | Finkelstein . | |
| 5,103,221 | 4/1992 | Memmola . | |
| 5,105,162 | 4/1992 | Fleissner et al. . | |
| 5,109,152 | 4/1992 | Takagi et al. | 380/23 X |
| 5,113,441 | 5/1992 | Harada . | |
| 5,115,236 | 5/1992 | Kohler . | |
| 5,136,642 | 8/1992 | Kawamura et al. . | |
| 5,144,667 | 9/1992 | Pogue, Jr. et al. | 380/25 X |
| 5,146,215 | 9/1992 | Drori | 340/825.31 X |
| 5,161,190 | 11/1992 | Cairns . | |
| 5,179,592 | 1/1993 | Kusano . | |
| 5,191,610 | 3/1993 | Hill et al. . | |
| 5,195,136 | 3/1993 | Hardy et al. . | |
| 5,220,606 | 6/1993 | Greenberg . | |
| 5,220,616 | 6/1993 | Downing et al. . | |
| 5,222,141 | 6/1993 | Killian . | |
| 5,224,161 | 6/1993 | Daniel et al. . | |
| 5,231,667 | 7/1993 | Kojima . | |
| 5,241,598 | 8/1993 | Raith . | |
| 5,243,650 | 9/1993 | Roth et al. . | |
| 5,243,653 | 9/1993 | Malek et al. . | |
| 5,272,755 | 12/1993 | Miyaji et al. . | |
| 5,276,738 | 1/1994 | Hirsch . | |
| 5,280,267 | 1/1994 | Reggiani . | |
| 5,313,491 | 5/1994 | Schramm et al. . | |
| 5,313,530 | 5/1994 | Iwamura . | |
| 5,317,639 | 5/1994 | Mittenthal . | |
| 5,319,364 | 6/1994 | Waraksa et al. . | |
| 5,319,710 | 6/1994 | Atalla et al. . | |
| 5,365,225 | 11/1994 | Bachhuber . | |
| 5,369,706 | 11/1994 | Latka . | |
| 5,377,270 | 12/1994 | Koopman, Jr. et al. . | |
| 5,398,284 | 3/1995 | Koopman, Jr. et al. . | |
| 5,412,379 | 5/1995 | Waraksa et al. . | |
| 5,420,925 | 5/1995 | Michaels . | |
| 5,434,806 | 7/1995 | Hofverberg . | |
| 5,436,901 | 7/1995 | Koopman . | |
| 5,442,341 | 8/1995 | Lambropoulos . | |
| 5,479,511 | 12/1995 | Naccache . | |
| 5,511,124 | 4/1996 | Bergner . | |
| 5,517,189 | 5/1996 | Bachhuber et al. . | |
| 5,528,230 | 6/1996 | Kim . | |
| 5,554,977 | 9/1996 | Jablonski et al. . | |
| 5,555,303 | 9/1996 | Stambler . | |
| 5,563,600 | 10/1996 | Miyake . | |
| 5,588,058 | 12/1996 | Le Berre . | |
| 5,598,476 | 1/1997 | LaBarre et al. . | |
| 5,604,488 | 2/1997 | Lambropoulos . | |
| 5,619,475 | 4/1997 | Winkler . | |

OTHER PUBLICATIONS

Morgan, Harvey L., "An Emitter Follower Oscillator", rf design feature, no date.

Demma, Nick, "Balanced Meissner Oscillator", rf design awards, Dec., 1993.

Taylor, Craig and Kenny, David, "Basic Crystal Oscillator Design Considerations", RF tutorial, no date.

Brown, Fred, "Stable LC Oscillators", rf design feature, Mar., 1987.

Mitsumi ICs, "The Best Way to Protect a Microprocessor", no date.

IEEE Industrial Electronics Society, Edited by Newman, John G. and Martinsons, Robert, "Automotive Applications of Microprocessors," Oct. 25–26, 1984, Dearborn, MI.

Breed, Gary A., "A Basic Review of Feedback," rf tutorial, Apr., 1993.

Key, Edwin L., "An Analysis of the Structure and Complexity of Nonlinear Binary Sequence Generators," IEEE Transactions on Information Theory, Nov., 1976.

Application for Equipment Authorization, Federal Communications Commission, Grantee: General Motors, Dated Nov. 15, 1990 and grant of Equipment Authorization, Dated: Jan. 14, 1991.

Relevant Art to the Cryptography Portfolio, no date.

MICROPROCESSOR
16-ID
39-ENCRYP
7-ECC
16-CMPR
4 x 16 IDs
OK-2
OK-1
EC
SR
39
FB XOR
5 XOR
CMND
CMPR
FIFO
CLK
20-LFSR
FB-XOR
DNLD
PANIC/RESYNC
DNLD JMPR
RCVR

RCVR

FOB – ENCRYP

FOB – ENCRYP

SWITCH INTRPT
209
SW WRD = SW WRD OR SW
SET RESYNC FLG
STOP RNDM CTR
210
RETURN

214
POWER UP
WAIT
219
WAIT 500 MS
220
STOP
215
OTHER FOB
248
N
RCVR INTRPT
216
Y
19 SR (N) = 19 SR BUF
20 SR (N) = 20 SR BUF
249
SERIAL RECV 64 BITS
CALC ECC
FIX SINGLE ERROR
217
N
ECC = OK
218
Y
n = 4
221
BIT-WISE CMPR ID TO ID(n)
223
N
EQUAL
224
DECR n
225
Y
N = n
227
N
n = 0
226
Y
19 SRBUF = 19 SR(N)
20SR(BUF)=20SR(N)
228
WAIT
219
Y
P/R BIT = 1
N
229
230
261
PANIC/RESYNC DECRYP
NORMAL CMND DECRYP

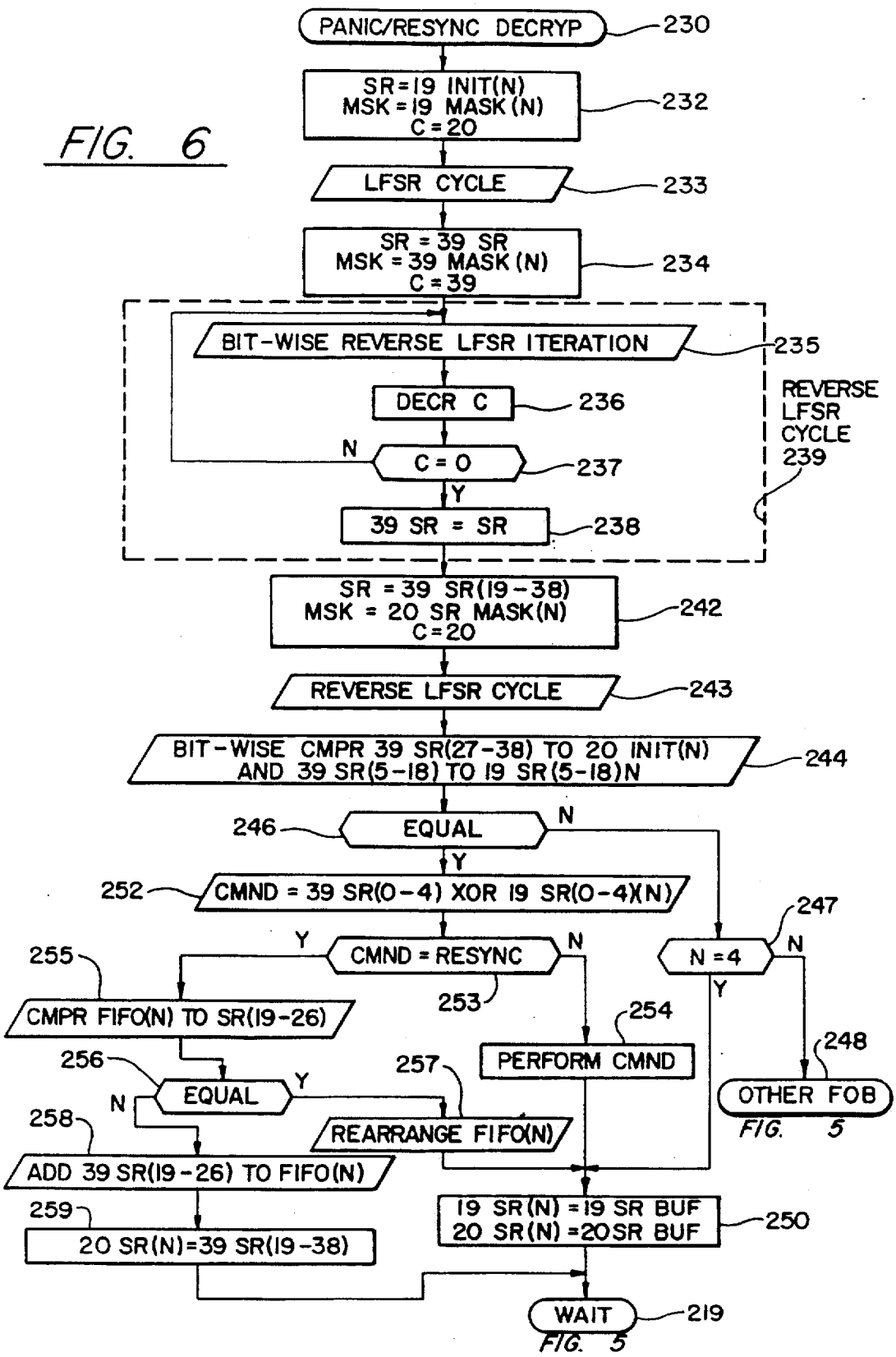
FIG. 6
PANIC/RESYNC DECRYP
230
SR=19 INIT(N)
MSK=19 MASK(N)
C=20
232
LFSR CYCLE
233
SR=39 SR
MSK=39 MASK(N)
C=39
234
BIT-WISE REVERSE LFSR ITERATION
235
DECR C
236
N
C=0
237
Y
39 SR = SR
238
REVERSE LFSR CYCLE
239
SR=39 SR(19-38)
MSK=20 SR MASK(N)
C=20
242
REVERSE LFSR CYCLE
243
BIT-WISE CMPR 39 SR(27-38) TO 20 INIT(N)
AND 39 SR(5-18) TO 19 SR(5-18)N
244
246
EQUAL
N
Y
252
CMND = 39 SR(0-4) XOR 19 SR(0-4)(N)
247
Y
CMND = RESYNC
N
N=4
N
255
253
Y
CMPR FIFO(N) TO SR(19-26)
254
PERFORM CMND
248
256
257
EQUAL
Y
N
OTHER FOB
258
REARRANGE FIFO(N)
FIG. 5
ADD 39 SR(19-26) TO FIFO(N)
259
19 SR(N)=19 SR BUF
20 SR(N)=20SR BUF
250
20 SR(N)=39 SR(19-38)
WAIT
219
FIG. 5

NORMAL CMND DECRYP
261
TRY CTR = 256
SR = 39SR
MSK = 39 MASK(N)
C = 39
262
REVERSE LFSR CYCLE
267
SR = 20 SR(N)
MSK = 20 MASK (N)
RNDM BITS = 20 BITS
271
RNDM BITS = 11
RNDM BITS = 00
272
Y
Y
N
273
C = 1
274a
C = 3
C = 2
274
LFSR CYCLE
275
SR = 19 SR(N)
MSK = 19 MASK(N)
RNDM BIT = 19 BIT
276
RNDM BIT = 1
Y
N
277
278
C = 3
C = 2
279
LFSR CYCLE
280
BIT-WISE CMPR : 39 SR(5-18) TO 19 SR(5-18)(N)
AND 39 SR(19-38) TO 20 SR (0-19)(N)
284
EQUAL
N
Y
285
288
DECR TRY CTR
286
CMND = 39 SR(0-4) XOR 19 SR(0-4)(N)
TRY CTR = 0
N
Y
289
PERFORM CMND
287
N = 4
Y
N
290
292
19 SR(N) = 19 SR BUF
20SR(N) = 20SR BUF
ANOTHER FOB
248

WAIT
219

PSEUDORANDOM NUMBER GENERATION AND CRYTOGRAPHIC AUTHENTICATION

Matter enclosed in heavy brackets [ ] appears in the original patent but forms no part of this reissue specification; matter printed in italics indicates the additions made by reissue.

TECHNICAL FIELD

This invention relates to pseudorandom numbers and cryptographically encoded transmissions, such as the type involved with an automobile key chain fob transmitter which opens the automobile door locks or trunk in response to transmissions from the fob.

BACKGROUND ART

The art of encoding transmissions so that the transmissions may be authenticated at a receiving module must meet criteria for technical viability (security) as well as low cost and convenience. The cost and convenience criteria result in an inability to use any encoding with polynomials of excessive degree (such as binary numbers of hundreds of bits). Furthermore, cryptographic processing must require less than one second for acceptability by the user. Cost and weight constraints can limit the size and sophistication of a microprocessor or other signal processing equipment used in the system.

An example of such a system is disclosed in commonly owned U.S. Pat. No. 5,191,610 to Hill and Finn. That system utilizes linear feedback shift register pseudorandom number generation having the same seed number and the same, fixed feedback mask in the receiver as in the transmitter. The number of iterations of linear feedback shift register pseudorandom number generation are counted in both the receiver and the transmitter, there being one additional iteration each time that a command is sent. Should the receiver not recognize one of the transmissions (because the transmitter was inadvertently activated at a great distance from the receiver, or otherwise), the receiver is allowed a moderate number of catch-up iterations in which it attempts to match the received transmission. Should that fail, the transmitter tells the receiver how many iterations from the seed it should perform in order to recreate a new current pseudorandom number in order to resynchronize the receiver to the transmitter pseudorandom number.

The aforementioned system requires that a receiver and a transmitter be wired or loaded with a binary feedback mask at the factory and sold as a pair. It also precludes matching a replacement transmitter with an existing receiver without the involvement of dealership personnel, which could compromise security. The pseudorandom number generators of the Hill and Finn patent use one iteration per encrypted message. This saves time but results in a certain level of correlation between successive samples, so that the samples are less random-like. In other pseudorandom number applications, the speed advantage of the aforementioned system could be useful but for the inherent correlation.

Any such system, except one that uses a truly random number of infinite degree, can be compromised either by analysis of a succession of intercepted signals, or by a brute force, exhaustive numerical trial approach which simply tries every number possible as the authentication word (the code or key).

Coded keypads used for unlocking vehicles have inherent security features. The generation of the code word by pressing keys can be shielded from view, and is certainly not capable of being determined beyond a line of sight. Furthermore, there would be great risk for an intruder entering every possible number into a keypad in an attempt to replicate the code (unless, of course, the automobile were parked in an unobservable area, such as a private or otherwise vacant garage). Thus, the keypad cannot be breached by analysis, and is not likely to be breached by numerical trial.

In contrast, lock systems which employ remote transmissions are enormously subject to security tampering because the surveillance of the transmissions may be carried out in another vehicle, without attracting any attention whatsoever. Therefore, it is possible to record many transmissions to a given vehicle, such as in a reserved workplace parking space (which commonly contains expensive cars), as well as providing an unobservable opportunity to attempt the breach of a security system (or even several systems at one time) by broadcasting huge volumes of random numbers, in parking lots where vehicles remain for long periods of time, such as at airports.

Whenever a transmitter is newly assigned to be used with an existing receiver, it is not sufficient to allow the new fob to identify itself and become authorized, without limiting that activity to a time when there is authorized access to the receiver through other than the transmitter itself (that is, within the vehicle itself). Thus, access to the vehicle by means of a traditional key or the like assures the safety of matching a newly assigned transmitter to an existing receiver. In the case of loss of synchronization between the transmitter and the receiver, simply allowing the receiver to synchronize to a particular pseudorandom number provided thereto by the transmitter makes it too easy for a surreptitious breach of security based on the analysis of a few transmissions, and synchronizing thereafter to one of the previous transmissions, utilizing numbers expected to be successful based upon analysis. Mere obfuscation of the resynchronizing code could be compromised by analysis of successful resynchronizations, and determination of the obfuscation function. The danger is not just that a single car might be broken into, but that a sophisticated capability might be developed and thereafter utilized extensively to breach the security of a large number of automobiles of a similar type.

DISCLOSURE OF INVENTION

Objects of the invention include provision of an improved remote operating system, the security of which is extremely difficult to breach by analysis, in which analysis of transmitted signals provides essentially no assistance in reducing the amount of numbers required for a numerical trial breach of security, and in which numerical trial breach of security requires, at a minimum, a prohibitively long time, rendering the vehicle essentially secure to brute force numerical trial attack, and which is useful only on a per vehicle basis. Other objects include rapid pseudorandom number generation with minimal correlation.

This invention is predicated on our observation that introducing non-linearities into the Galois field operation of linear feedback shift register pseudorandom numbers can render a code very difficult to breach by or with aid from numerical analysis. The invention is further predicated on the fact that time constraints on authentication can render the numerical trial approach essentially useless. The invention is predicated in part on the reversibility characteristic of the well-known exclusive OR operation, and on the reversibility of encryption such as encryption involving linear feedback shift register operations.

According to the present invention, an encryption, such as a linear feedback shift register pseudorandom number generation operation, is performed on a word comprising a pair of concatenated, independently generated numbers, which may themselves be encrypted (such as pseudorandom numbers) and the result transmitted to a receiving module where a decryption, such as a reverse pseudorandom number generation operation, recovers the concatenated numbers for cryptographic authentication. In accordance further with the invention, the encryption and decryption are performed with a secret mask essentially unique to the transmitter. According further to the invention, an encrypted number, such as a pseudorandom number, used for cryptographic authentication contains command bits exclusive ORed into at least a portion thereof.

According to the invention, a number utilized in authentication of command transmissions is generated by an iterative encryption process, such as a linear feedback shift register pseudorandom number generation operation, which has a variable number of iterations per authentication, the number varying in response to a pseudorandom event. According further to the invention, a pair of [pseduo] *pseudorandom* numbers are iteratively encrypted, such as by linear feedback shift register pseudorandom number generation operations, using a different number of iterations in each successive encryption, the sequence of the number of iterations of one of them being different from the sequence of the number of iterations of the other of them said number of iterations being based upon respectively different pseudorandom events related to the respective words.

According to the invention, a plurality of transmitters are usable with a single receiver by means of secret numbers such as initial values and feedback masks for feedback shift register encryption) essentially unique to each transmitter which are replicated in any receiver with which a transmitter is to be used, the receiver being capable of determining if each received transmission can be authenticated utilizing the initial values and masks of any of its assigned transmitters.

In accordance with the present invention, the initial secret values and feedback masks of transmitters to be associated with a given receiver are stored (such as in an erasable read-only memory) by downloading the secret numbers of a transmitter into a receiver, thereby permitting the addition of a transmitter to the family of transmitters to which a receiver can respond. Although this may be performed at a dealership, it does not require, nor need it permit, human knowledge of the precise numbers; therefore, the possibility of surreptitious access is nearly eliminated. In further accord with the invention, identification numbers are associated with the secret numbers of each transmitter, which prescreen transmissions before authorization attempts, thereby reducing nuisance operations from similar, unauthorized transmitters, and reducing the time required for multiple authentication attempts.

According to the invention, the reception of each word causes the receiver of a remote operating system to become unresponsive to further transmissions for a period of about one-half second or more, thereby significantly inhibiting the capability to breach the security thereof through exhaustive numerical trails.

According to the invention, cryptographic authentication of transmissions from a remote transmitter to a receiver module involves encryption, such as by linear feedback shift register pseudorandom number generation operations, utilizing secret feedback masks which are essentially unique to each transmitter, and replicated only in a receiver which is to respond to the related transmitter.

Random iterations of the invention reduce correlation between successively generated pseudorandom numbers. Cooperative use of all of the aforementioned features in a remote operating system renders the system extremely difficult to breach by analysis; and use of a half-second delay, for example, causes a 50% statistical probability of a 39 bit encrypted key word being breached by exhaustive numerical trials to require more than one month.

The invention may be used in remote systems other than automobile lock systems.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
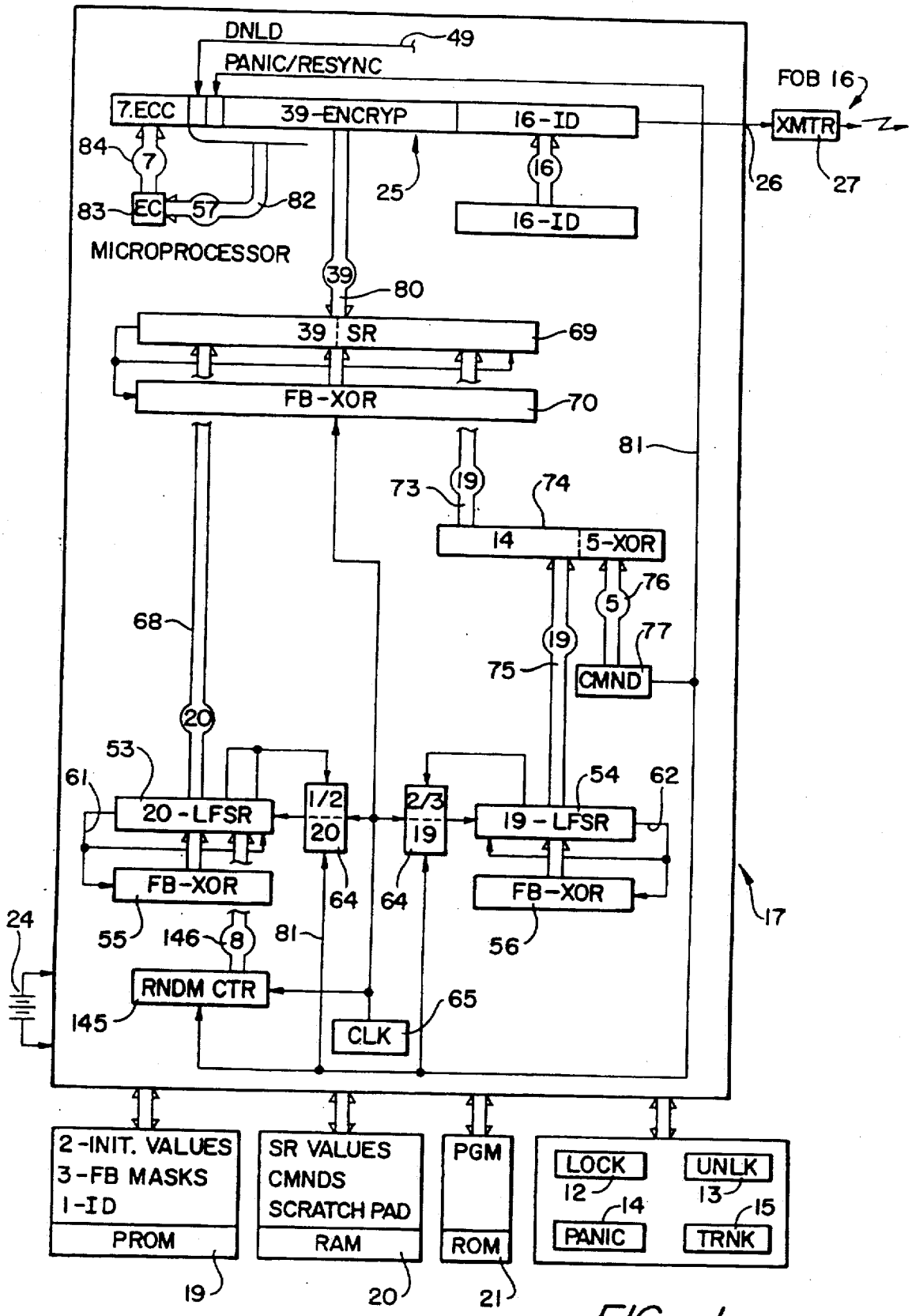
FIG. 1 is a stylized, simplified schematic block diagram of a transmitter according to the invention.

One example of the present invention is its use in a remote, encrypted automobile door and trunk locking and unlocking mechanism. The command to perform a certain task, such as a lock-related command (lock or unlock the doors, release the trunk), or to operate the lights and the horn or other alarm on the automobile in the event of a panic situation, or to cause cryptographic synchronization or resynchronization between the transmitter and the receiver module in the automobile, are under control of a plurality of buttons 12–15 disposed on a keychain fob or other hand-held transmitter unit shown in FIG. 1. The switches 12–15 may be tactile or touch-type and feed a microprocessor 17 which is associated with a PROM 19, a RAM 20 and a ROM 21. The PROM 19 is programmable only once, capable of having one set of output/input relationships burned therein, as is well known in the art. Typically, upon manufacture, each fob 16 will have its PROM burned in so as to establish a 16 bit identification number, which is not protected as secret information, as is described more fully hereinafter; two secret initial (seed) values from which encrypted messages are originated; and three secret feedback masks defining suitable polynomials for feedback exclusive ORing in the encryption process, for the life of the fob, all as is described hereinafter. The RAM 20 is used as a scratch pad memory, in the usual way, and will contain changing values of the shift registers and commands, as described hereinafter. The program for the microprocessor 17 is contained in the ROM 21.

It is assumed that the microprocessor 17 is the type which has a stop mode in which the clock does not run, and the only function that the microprocessor can perform is to respond to an external interrupt, which in this case would be the closure of one of the switches 12–15. This keeps power consumption extremely low, and a suitable battery 24 could last about five years. The microprocessor 17 assembles a 64 bit command request word 25 which is applied serially over a line 26 to a suitable transmitter 27 (e.g., RF or infrared), which serially transmits the command request, as digital bits or otherwise, a suitable distance, such as not more than 10 meters. The fob 16 will, before beginning its useful life, be associated with a particular automobile along with up to three more fobs (n the example herein) so as to form a set of up to four fobs, any one of which can operate the locks or the panic alarm of a related receiver module 30 in an automobile or other secured enclosure. The receiver module 30 in the automobile includes a receiver 31 which receives the serial bits and applies them over a line 32 to a microprocessor 33, where the 64 bit word 25 is replicated in a 64 bit word 38. The microprocessor 33 is powered from the automobile battery system 39. The microprocessor 33 has an electrically erasable PROM 40, a RAM 41 and a ROM 42 associated therewith. Each fob 16 is associated with a module 30 at a dealership, so that lost fobs may be replaced and matched to the module 30 anytime. A 64 bit word 25 (FIG. 1) is formulated with each fobs' ID, secret initial values and masks, and a download signal is provided, in some fashion, by factory personnel on a line 49. This may be achieved by a jumper, or in any other suitable way, since it does not pose a security threat unless the receiver 30 is tampered with simultaneously, which can be avoided as described below. The 64 bit word 25 sent to the receiver module 30 during a download includes one bit indicating the download operation. The presence of the download bit in the 64 bit word 38 (FIG. 2) can result in a download signal on a line 50 provided that the auto receiver 30 has been put into a download condition, such as by the installation of a download jumper 51 or other security measure. When download is suitably indicated, the fob ID and two initial values from the PROM 19 will be stored in the electrically erasable PROM 40. Then two secret feedback masks, of the same bit length as the initial values, will be sent with the ID in a similar fashion; and finally, a feedback mask which is as long as the concatenation of the two initial values is sent from the PROM 19 to the EE PROM 40 in the auto receiver 30. In a similar fashion, the initial values, feedback masks and ID's of three other fobs (in this example) will be loaded into the auto receiver 30 during valid download operations.

Figures 2A, 2B:
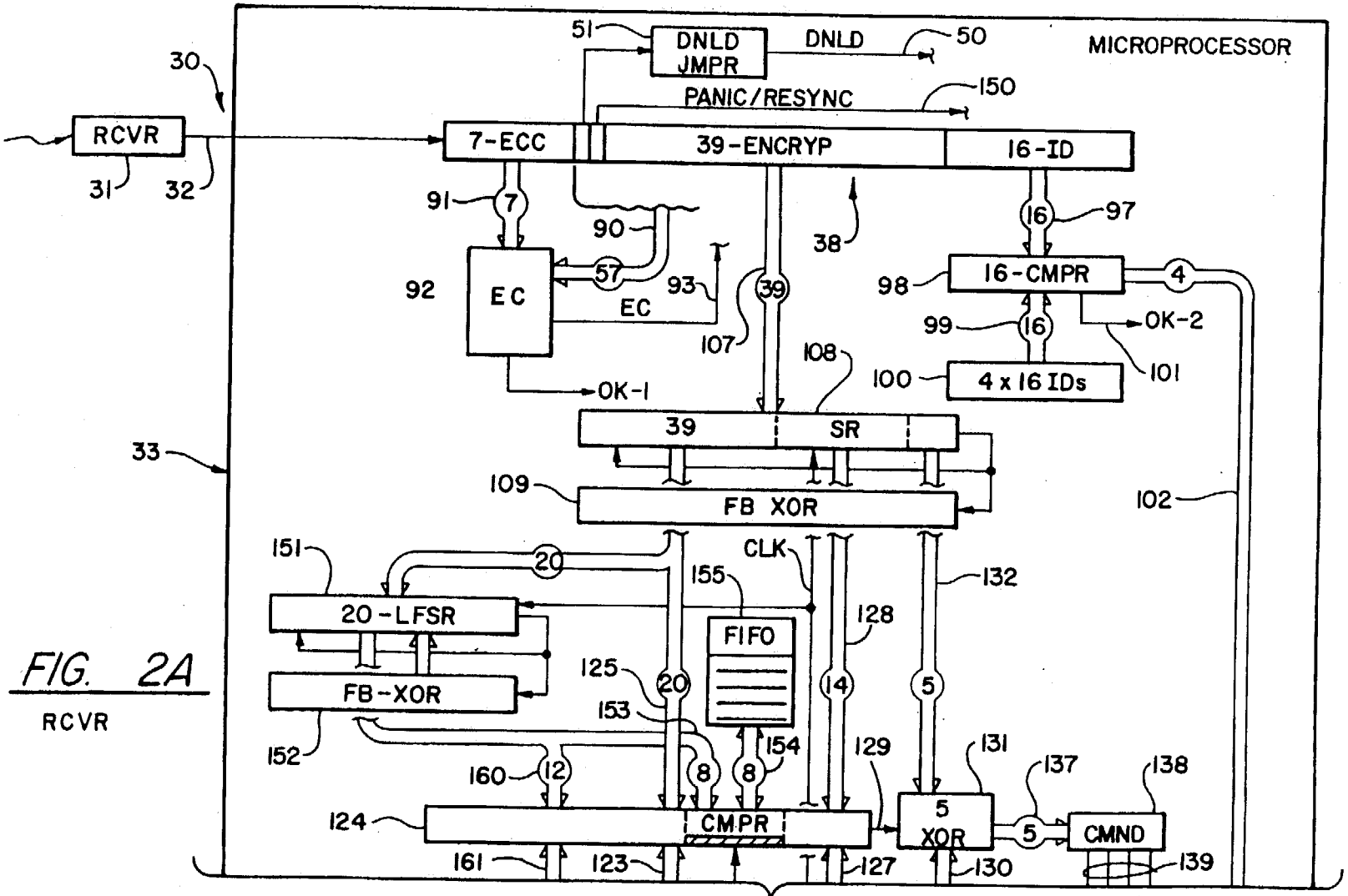
FIG. 2 is a stylized, simplified schematic block diagram of a receiver according to the invention.
Figure 2B:
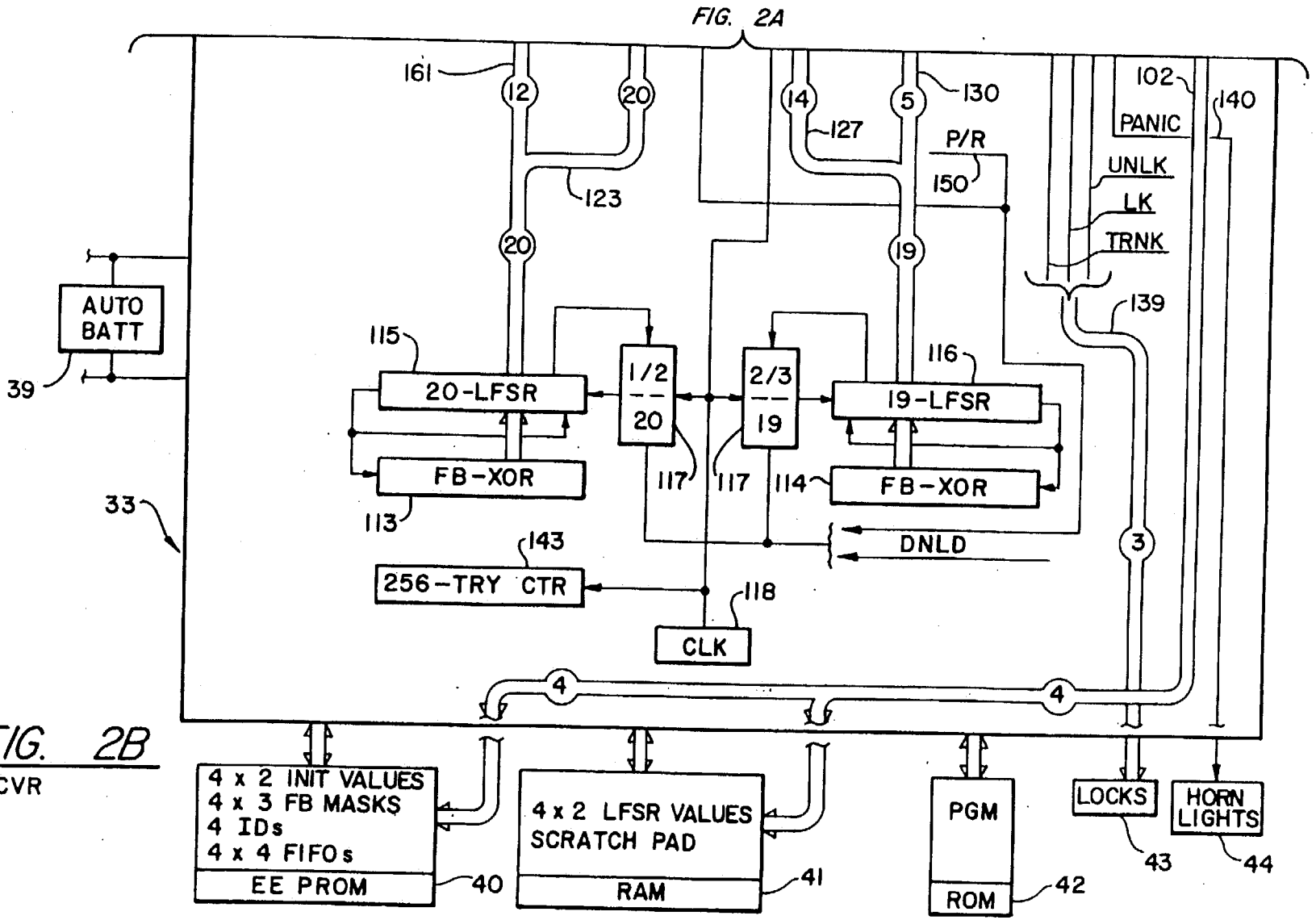

The word 25 appears in FIG. 1 to be within a special 64 bit register. However, the word 25 actually appears in various parts of the RAM 20, in addresses designated to be used for holding the parts of the outgoing, serially transmitted word. Similarly, all of the apparent hardware within the microprocessor 17 is merely illustrative of processes and relationships, which may indeed be performed by hardware which resembles that illustrated in FIG. 1, or may be implemented, as is preferred, by processing of bits utilizing the RAM 20 as a scratch pad memory, by means of software which is well within the skill of the art in the light of the teachings which follow hereinafter.

The microprocessor 33 has functions and processes illustrated therein which may either be hardware or software, as described with respect to FIG. 1 hereinbefore.

The narrative with respect to FIG. 1 is of a form describing hardware: software implementation of the invention is described with respect to FIGS. 3–7, hereinafter.

The receiver module 30 is connected to the locks 43 of the automobile, as well as to the automobile horn and lights 44, or other suitable alarm arrangements on the automobile.

Before a fob can be utilized to operate the locks or alarms on an automobile, synchronization must occur. Herein, this is also referred to as resynchronization since it is utilized at different times during the life of the system, as described hereinafter. This resynchronizaton process is described hereinafter; suffice it at this point to say that the process will begin with the two secret initial (seed) values for the fob 16 located in a 20 bit linear feedback shift register (LFSR) 53, and a 19 bit LFSR 54, and suitable feedback masks for each of the LFSRs 53, 54 available at the input of corresponding feedback exclusive ORs 55, 56. The initial synchronization (an initial resynchronization command) includes 20 iterations of the shift register 53 and at least 19 iterations of the shift register 54, so as to provide a complete bit-wise convolution. For ease in programming, both shift registers may be provided with 20 iterations during initialization (which is assumed herein). In each cycle, the high order bit is transferred by a line 61, 62 to the low order bit and is also exclusively ORed with those bits of the shift registers 53, 54 identified by bits in the feedback masks, to form the next higher order bits within the shift registers 53, 54. This is the very well known function of linear feedback shift registers, in the process of generating maximal length *pseudorandom* numbers, as described in Numerical Recipes, Press, Flannery, Teukolsky, and Vetterling; Cambridge University Press, Cambridge, Mass. (1986). The feedback mask has to represent a suitable polynomial so as to provide a maximal length code, having degree N, which repeats only after $2^N$-1 iterations. This is more fully set forth at pages 108–109 of Error Correcting Techniques for Digital Communication, Michelson and Levesque, John Wiley & Sons, New York, N.Y. (1985), and in Appendix C of Error Correcting Codes, Pederson and Weldon, MIT Press, Cambridge, Mass. (1972).

One embodiment herein uses linear feedback shift registers, in some cases modified to be non-linear feedback shift register systems by shifting a pseudorandom number of iterations as described hereinafter. However, other well-known pseudorandom number generation techniques may be used such as linear congruential pseudorandom number generators or non-linear congruential pseudorandom number generators as more fully set forth in Chapter 3 of The Art of Computer Programming, Volume 2/Seminumerical Algorithms, ed. 2, Knuth, Addison Wesley, Reading, Mass. (1981); or inverse congruential pseudorandom number generators or generalized feedback shift register pseudorandom number generators as more fully set forth in Chapters 7, 8 and 9 of Random Number Generation and Quasi-Monte Carlo Methods, Niederreiter, SIAM, Capitol City Press, Montpelier, Vt. (1992); or multiplicative, I/P, power, discrete exponential, kneading map, shift register, or cellular automatic pseudorandom number generators as more fully set forth in "Pseudorandom Number Generators in Cryptography and Number Theory", J. C. Lagarias, pages 115–143 of Cryptology and Computational Number Theory, Pomerance, ed, Volume 42, Proc. SIAM (1990).

In general the pseudorandom number generator need not be reversible. A reversible generator is one where, given the current pseudorandom number and complete knowledge of the generation process, the previous pseudorandom number may be determined. For example, a linear feedback s register pseudorandom number generator is reversible.

The manner in which the system is originally synchronized and the registers are made ready to operate is described hereinafter, because the general operation should be first understood.

In the usual case, when everything has been established and the system is operating normally, assume that a lock, unlock or trunk release command has been provided by pressing one of the buttons 12–15. This will cause the microprocessor 17 to wake up and perform one cycle of operation. In the cycle of operation, the RAM 20 provides the values which were previously left in the shift registers 53, 54 and the PROM 19 provides the masks for the shift registers 55, 56. Then, depending upon some pseudorandom event, such as the status of one or more bits of the shifts registers 53, 54, each of the shift registers will be provided one or two iterations or two or three iterations of linear feedback shifting due to the effect of clock gates 64 on the output of a clock 65. This is a fist aspect of the present invention: instead of being shifted a number of times equal to the number of bits (which takes too many cycles to permit 256 attempts at decryption), the shift registers are only put through a few iterations after the initialization. Because this provides less scrambling of the feedback bits, the difficulty of mathematically ascertaining what the code might be is increased by causing the LFSRs to each undergo a different, variable number of iterations, in successive cycles, in a pseudorandom fashion. The pseudorandom number provided by the iterations of the shift register 53 is supplied over a trunk of 20 lines 68 to a 39 bit shift register 69. The shift register 69 is associated with feedback 70 in the same fashion as the LFSRs 53, 54, with the exception that the shift register 69 is loaded with new numbers before each cycle of shifting feedback iterations. In this sense, then, the shift register 69 and feedback operate more as a cyclic redundancy code generator. The other input to the 39 bit shift register 69 is a trunk of 19 lines 73 from a gate 74 that causes the low order 5 bits of the 19 bit LFSR 54 on a trunk of lines 75 to be exclusive ORed with 5 bits on a trunk of 5 lines 76 from a command register 77. The command register 77 simply registers up to 32 commands encoded from the operation of any of the switches 12–15 (or fewer commands if some bits are used in a discrete fashion). Thus, in each cycle, there is presented to the 39 bit shift register 69 the outputs of the LFSRs with a command exclusive ORed in the low order bits of one of them. Then, the shift register 69 undergoes 39 iterations of LFSR-type feedback through an exclusive OR process 70, which utilizes a secret feedback mask provided by the PROM 19. This provides a full bitwise convolution of the two words from the shift registers 53, 54, which is a cryptographic necessity. Use of the shift register 69 may be employed in prior art systems, such as the two-generator embodiment of the Hill and Finn patent. When the 39 iterations are complete, the result is an encrypted, key word provided on a trunk of 39 lines 80 to the 64 bit word 25, along with 16 fob ID bits from the PROM 19, a download bit 49 if appropriate, and a command flag such as a panic/resynch bit provided from the command register 77 on a line 81, when appropriate. In the usual case of authentication, both of the download and panic/resynch bits will be 0's. Then, all of these bits are monitored on a trunk of 57 lines 82 by an error correcting code circuit 83 to create a 7 bit error correcting code component on a trunk of 7 lines 84 for the 64 bit word 25; typically, a single error correcting, multi-error detecting code (such as a Hamming code) will be used. The illustrated embodiment of the invention uses a linear feedback shift register as a cyclic redundancy code generator for encrypting the input into a key word. However, any of several well-known reversible encryption techniques may be used. For instance, the McEliece error correcting code encryption; the RSA cryptosystem; discrete exponentiation cryptosystem; linear or non-linear, full length or truncated congruential cryptosystems; or the DES cryptosystem, as more fully set forth in Chapter 10 of Contemporary Cryptology: The Science of Information Integrity, Simmons, ed., IEEE Press New York, N.Y. (1992).

When the 64 bit word is fully assembled, it is transmitted serially (bit-by-bit) or otherwise, by any well-known technique, through the transmitter 27 to the receiver 31 of the receiver module 30 to become the 64 bit word 38 therein. All of the bits of the word 38 are applied over trunks of 57 lines 90 and 7 lines 91 to an error correcting and detecting process 92. If a single bit error has occurred, a signal on a line 93 (as appropriate) will correct the bit that is in error. If a multiple bit error is detected, the process is totally void, and the receiver module 30 simply goes into a half second wait state, which simply slows down any attempts to crack the code which is being used, as is described more fully hereinafter. If a multiple bit error has occurred but is not detected, the cryptographic authentication process will almost certainly fail. On the other hand, if the error correcting code shows that the 64 bit word 38 has no errors, then a first OK signal is provided on a signal line 94.

When it is believed that there are no errors in the 64 bit word 38, it is proper to determine whether the 16 bit, non-secret identification word matches any of the fobs that have been loaded into the receiver module 30. The ID of the fob reduces the probability that a command from a wrong fob will be cryptographically acceptable; it also reduces the amount of time it takes to iterate the code words in the receiver module to reach authentication (a match). However, in this embodiment, there is no restriction on which fobs are assigned as a group to an automobile, and it is assumed that there is approximately one chance in 11,000 that two fobs assigned to a particular automobile will have the same ID number. A feature of the invention is that if one fob with matching ID does not become authenticated, the receiver module 30 will see if there is another assigned fob with that same ID number, and if so, attempt authentication.

The 16 bit ID in the 64 bit word 38 is provided over a trunk of 16 lines 97 to a 16 bit compare circuit 98, the other inputs of which, on a trunk of 16 lines 99, are provided by the ID register 100, which really represents four different locations in the EE PROM 40, one for each associated fob. If, indeed, the message has come from one of the four associated fobs, a second OK signal appears on a line 101, and the identification number of the fob which has sent the message is provided on a trunk of 4 lines 102 to the PROM 40 and to the RAM 41 so as to utilize in the ensuing decryption process the secret mask for the selected fob and the two LFSR values which have previously been created for that fob. The previous LFSR values are utilized rather than the initial secret values, because, according to the invention, the LFSR values are built upon, with only one, two or three iterations for each command received by the receiver module 30.

At this stage, the normal decryption process can begin. The 39 bit encrypted key word is provided over a trunk of 39 lines 107 to a 39 bit shift register 108 which can be identical in either structure or function to the 39 bit shift register 69 in the fob, except that it is iterated in a reversing process. The reversing process is easily understood, one bit at a time, by considering how the received 39 bits got to be what they were. In the last iteration between the shift register 69 and the exclusive OR circuit 70 (FIG. 1) if the high order bit (leftmost bit in FIG. 1) was a 1, then exclusive ORing in accordance with the secret mask is provided against each bit of given order in the 39 bit shift register in order to determine what the next bit in order would be at the end of the iteration. That is to say, the ninth bit becomes the tenth bit (0 or 1 as the case may be) unless it is inverted by the exclusive OR. In order to be inverted by the exclusive OR, the ninth bit of the secret mask would have to be 1, and the most significant bit at the start of the iteration would also have to have been 1; and the most significant bit advances to the least significant stage, in a wraparound. If either the most significant bit is a 0 or the corresponding bit in the secret mask is a 0, the ninth bit would simply advance into the tenth stage. Since what was the most significant bit becomes the least significant bit, inspection of the least significant bit determines whether or not exclusive ORing occurred. If the least significant bit in the shift register 108 is a 1, it is applied to exclusive OR the bits of each order with the same secret mask which was downloaded for this fob originally. For any bit (such as the ninth bit) for which there is a corresponding bit in the secret mask, whenever the lowest ordered bit at the start of the iteration is a 1, that bit will be inverted from 1 to 0 or from 0 to 1. But if there is no corresponding bit in the secret mask then the bit in question is simply advanced to the next lower order stage (in the example here, bit 10 becomes bit 9) without being inverted. Or, if the least significant bit (the rightmost bit in FIG. 2) is a 0, then none of the bits are inverted as they are advanced from one stage to the next lower stage in the shift register 108. By doing this the same number of times (39 iterations in the example herein), the original word in the 39 bit shift register 69 is reconstructed. The operation of the 39 bit shift register is very much like cyclic redundancy code (CRC) generators, used for error detection and correction. The process in the 39 bit shift registers herein is the same as in the LFSRs with the exception of the fact that the shift registers herein receive a whole new starting word before the iterations of each cycle. More on CRCs, Galois field arithmetic, and the generation and utilization of pseudorandom binary numbers, may be found in Theory and Practice of Error Control Codes, Blahut, Addisson Wesley Pub. Company, Reading, Mass. (1984); An Introduction to Error-Correcting Codes, Shu Lin, Prentice Hall, Englewood Cliffs, N.J. (1970); and Error-Control Techniques for Digital Communication, Michaelson and Levesque, John Wiley & Sons, New York, N.Y. (1985).

In decryption, part of the process is reversed, and part of it is matched. Thus, the 39 bit encrypted code word is reversed by 39 reversing iterations, and the results thereof are compared to what should be identical results from the LFSRs.

Once a fob is identified in the 16 bit compare circuit 98, its two secret feedback masks are loaded (from RAM 41) for use in corresponding exclusive ORs 113, 114, and its previously achieved 20 bit LFSR value is loaded into a 20 bit LFSR 115, while its previously achieved 19 bit LFSR value is loaded into the 19 bit LFSR 116. Dependent upon a given bit of each of the LFSRs, the LFSR is shifted (with or without exclusive ORing as described hereinbefore) either once or twice, in the case of the LFSR 115 or two or three times in the case of the LFSR 116 in dependence upon a pair of corresponding gates 117 which control the application of a clock 118 thereto, in the same fashion as described with respect to FIG. 1 hereinbefore. The 20 bits of the 20 bit LFSR 115 so generated are applied over a trunk of 20 lines 123 to a compare circuit 124, to be compared with 20 bits provided from the 39 bit shift register 108 over a trunk of 20 lines 125. Similarly, the high order 14 bits which are generated in the 19 bit LFSR 116 are provided by a trunk of 14 lines 127 to the compare circuit 124 for comparison with 14 bits of the 39 bit shift register 108 provided on a trunk of 14 lines 128. Assuming that both the 20 bit and 14 bit words compare properly, this signals a successful authentication on a line 129 and the receiver module 30 is allowed to receive and respond to the command made by the fob.

Recalling that the five bit command is exclusively ORed to the low order five bit positions provided from the 19 bit LFSR 54, the only way to recover those bits is to exclusive OR the low order 5 bit positions from the 19 bit LFSR 116 with the low order 5 bit positions of the reconstituted word in the 39 bit shift register 108. Therefore, the low order 5 bit positions produced by the 19 bit LFSR 116 are provided over a trunk of five lines 130 to a five bit exclusive OR circuit 131, the opposite inputs of which consist of the lowest order 5 bit positions from the 39 bit shift register 108 on a trunk of 5 lines 132. The result of the exclusive OR on a trunk of 5 lines 137 comprise the command which is stored in a command register 138. The typical commands provided on a trunk of lines 139 to the locks 43 comprise door unlock, door lock, and trunk release. Another command indicated by a signal on a line 140 may comprise a panic command which will cause the horn and lights 44 (or other alarms) on the car to scare away a loiterer as the driver approaches the car with the fob (as described more fully hereinafter).

If the first attempt to match the outputs of the LFSRs 115, 116 with corresponding 34 bits of the 39 bit shift register 108 fails, then the LFSRs 115, 116 are cycled again. In each cycle, the LFSR 115 will be shifted once or twice depending upon the random bit utilized as a control over its gate 117, and the LFSR 116 will be shifted two or three times in dependence on the random bit utilized to control its clock gate 117. This is to allow the receiver module 30 to catch up, in cycles, and therefore in iterations, to the status of the LFSRs 53, 54 in the fob 16.

Anytime that one of the buttons 12–15 on the fob is depressed, the fob will undergo one cycle, and the shift registers 53, 54 will undergo one or two, or two or three iterations, respectively. The pressings of the buttons 12–15 may occur simply by being crushed in a purse, children playing with the fob, or otherwise. Since each fob keeps its own LFSR generated numbers, and the receiver module 30 likewise maintains separate LFSR generated numbers for each fob, each fob will generally be able to track with the receiver module except for the inadvertent pressings of the switches 12–15. Whenever the switches 12–15 have caused a cycle that is not responded to by the receiver module 30, the first time the switches are pressed and the receiver module does respond, the content of the LFSRs 115, 116 will not compare with the corresponding bits of the 39 bit shift register 108. However, provision is made in accordance with the invention to allow the receiver module 30 to initiate additional cycles, and the additional one or two iterations for the LFSR 115 and two or three iterations for the LFSR 116, so as to catch up to the fob. To this end, an 8 bit counter 143 allows the receiver module 30 to try to catch up to the fob in question by repeating as many as 256 cycles, automatically. In a normal case, the receiver module 30 will catch up to the fob in only a few cycles. But if the receiver module is more than 256 cycles behind, as may occur by repetitive pressings of one of the switches 12–15 in a suitcase or handbag, then the LFSRs 115, 116 will not match up with the 39 bit shift register 106. The receiver module 30 is non-responsive to incoming signals while it is attempting authentication of a previous signal; the 256 attempts to catch up will transpire in only a half second or less; thus, authentication will not be hampered by repetitive pressing of the unlock button 13 due to impatience. Eventually, the operator will understand that the receiver module is out of synchronization (cryptographic synchronization), and will press two buttons at one time (such as lock and unlock), or some other combination that will be recognized in the fob as a command to effect cryptographic resynchronization between the receiver module 30 and the fob 16, as well as to reinitalize following a loss of battery power (dead or changed), which allows the RAM data to disintegrate.

A recognized command to synchronize ("resynch command", hereinafter) in the command generator 77 (FIG. 1) will produce the panic/resynch bit on the line 81. The resynchronization process in accordance with the present invention includes returning to the beginning; that is, returning to the use of the secret initial values and starting all over again. As described hereinbefore, the resynch command is used to initialize the units in the first place, and when they become out-of-synch, they are in a sense reinitialized just as when they are new. To that end, the panic/resynch bit on the line 81 will cause the two initial secret values to be loaded from the PROM 19 to the LFSRs 53, 54 and the two initial secret feedback masks to be made available to the exclusive ORs 55, 56, and the 39 bit secret feedback mask to be made available to the exclusive OR 70. The panic/resynch command on the line 145 causes the clocking gates 64 to cause 20 iterations, respectively, of the LFSRs 53, 54. The purpose is that, utilizing as many iterations as there are bits in the word, causes the maximal mix of the feedback, regardless of what the mask is, to assure complete bit-wise convolution. In this case, however, two additional changes from normal occur: the eight low order bit positions of the shift register 53 are provided with a truly random number on a trunk of 8 lines 146 from an 8 bit counter 145 which is allowed to respond to the clock 65 in a manner related to pressing of the buttons 12–15, as described with respect to FIG. 3 hereinafter. Since it is impossible for persons to depress buttons carefully enough to achieve other than a random number at computer clocking frequencies (500 KHz or more), the likelihood of this number being exactly the same in successive resynch processes is extremely small. After twenty iterations of feedback shifting, with the low order 8 bit positions of the LFSR 53 comprising those from the counter 145, outputs of the 20 bit LFSR 53 and the 19 bit LFSR 54 are provided to the 39 bit shift register 69. The shift register 69 thereafter undergoes 39 feedback shifting iterations, of the type described hereinbefore, to produce the 39 bit encrypted word in the 64 bit word 25. As before, the 16 bit ID for the fob is provided to the word 25, along with a panic/resynch bit (described hereinbefore) to indicate that this is a panic or resynch request, and the error correction code is computed and the code bits added to the word 25 as described hereinbefore. The 20 bit LFSR and 19 bit LFSR results, after 20 iterations, form the pseudorandom starting words to be used in authenticating future transmissions.

In the receiver module 30, the first two steps are the same as in a normal command. Error correction is provided if possible, and if the word is correct, the first OK signal appears on the line 94. Then, the four possible IDs are compared with the incoming ID in the word 38, and if there is a match, the second OK signal appears on the line 101 and the signals on the trunk of four lines 102 tell the EE PROM 40 which fob is being worked with and therefore which of the sets of two secret initial values and three secret feedback masks should be utilized. The appropriate secret initial values and three feedback masks are loaded into the LFSRs 115, 116, and the exclusive ORs 113, 114 and 109. The content of the 39 bit shift register 108 is reconstructed by 39 reverse iterations, as described hereinbefore, so as to recover the word in the 39 bit shift register 69. However, since the output of the 20 bit LFSR 53 does not reflect 20 shift iterations of only the secret initial value that was placed therein, but rather represents 20 iterations of 12 high ordered bits of the secret initial value and 8 random low ordered bits, comparisons with the high order bits of the 39 bit shift register 108 cannot be made in the receiver module 30. Instead, the 20 bit LFSR value must be recovered in the same way that the 39 bit shift register value is recovered. That is, a reverse linear feedback shift register operation, utilizing the exclusive OR mask with the least significant bit, is achieved in a 20 bit LFSR 151 (FIG. 2) in association with a 20 bit exclusive OR 152. This restores the unscrambled number in which the 12 high order bit positions of the LFSR 151 should be the same as the 12 high order bit positions of the secret initial value in the 20 bit LFSR 115, and the low order 8 bit positions of the 20 bit LFSR 151 are some random number (produced by the counter 145).

The next step in the resynch process is to compare the high order 12 bit positions of the reconstituted word in the LFSR 151 with the 12 bits of the secret initial value of the 20 bit LFSR 115. Thus, the 12 bits on the trunk of 12 lines 160 are compared with the 12 bits on the trunk of 12 lines 161, which are created solely in response to the initial secret value. And, the 14 bits on the trunk of lines 127 are compared with the 14 bits on the trunk of lines 128; these should also compare because the 19 bit LFSR 116 has been pas through 20 iterations in response to its secret initial value so it should match the result in the 19 bit LFSR 54, the 14 high order bit positions of which have been reconstituted in the 14 bits of the 39 bit shift register 108 to which the trunk of lines 128 respond.

If both the 12 bit and 14 bit comparisons are successful, a determination is made whether the panic/resynch bit, provided on a line 150 from the 64 bit word 38, had been caused by a panic command or by a resynch command. If a resynch or panic command was sent, the resynch or panic command would have been exclusively ORed into the five low order bits of the 19 bit shift register 54, as described with respect to other commands hereinbefore. Therefore, the command will be extracted by the five bit exclusive OR 131 and provided over the trunk of lines 137 to the command register 138. Since performing the panic command cannot breach vehicle security, it is used as the default command; if the resynch command is not present on the line 140, then the panic/resynch command on the line 150 may be deemed to be a panic command, if desired, even if not decoded. Up to this point, the panic command and the resynch command are identical.

The next step in the resynch process is to compare the 8 bit random number in the low ordered bit positions of the 20 bit shift register 151 with the last four prior low order 8 bit random numbers received during resynchronizing. In the present invention, the random number is compared with the last four such random numbers previously received by providing the 8 low order bit positions of the 20 bit LFSR 151 on a trunk of 8 lines 153 to 8 bits of the compare circuit 124 which are also responsive to a trunk of 8 lines 154 from a first in, first out stack 155 (actually embodied in the EE PROM 40), which keeps track of the last four 8 bit random numbers received during resynchronization operations. If, during resynchronization, the 8 central bits of the compare circuit 124 compare with any of the four 8 bit words in the first in, first out stack (FIFO) 155, the operation is a failure, and the receiver module 30 reverts to a half second wait period before it will react to the next command (as described hereinafter) and the matched word goes to the head of the stack and remaining words in the FIFO are adjusted accordingly. On the other hand, if the 8 bit word on the trunk of lines 153 does not compare with any of the bits in the stack 155, the comparison is a success and the operation can proceed; additionally, the 8 bit word on the trunk of 8 lines 153 is applied over the trunk of lines 154 to the FIFO stack 155, for comparison with subsequent random 8 bit words during subsequent rsynchronization operations. In such a case, the new word goes in the FIFO and the oldest word is dropped out of the FIFO.

Assuming that there is no match of the 8 bit random word, the resynchronization operation is complete. When the resynchronization is commanded, after successful comparisons of the 12 high order bits and the 14 bits as described hereinbefore and no comparison with the FIFO, the values established in the shift registers 53, 54, 115 and 116 are left as they are, for use in authenticating the next normal command cycle.

The panic command is the same as has been described with respect to the resynch command, except that, if the command register 138 produces the panic command signal on the line 140, the lights and the horn 44 (or other alarm) are operated, and, all of the LFSRs 53, 54, 115, 116 are then restored to whatever setting they had immediately before sending and receiving the panic command. The panic command operates differently from lock, unlock and trunk release commands, so that there will be response, even with total missynchronization between the fob and the receiver module. In the case of the panic command, starting over with the secret initial values ensures that authentication (to avoid nuisance responses) will be successful on the first try. Therefore, the panic command in the fob (FIG. 1) causes the LFSRs to be loaded with the initial values in the PROM 19, rather than the shift register values which had been achieved to date through iterations in the RAM 20, and the panic/resynch process just descried is performed to ensure that there will be authentication to execute the panic command.

The foregoing description is given as if it were hardware, and indeed the invention may be implemented in hardware along the lines described hereinbefore. However, the invention has been implemented in suitably programmed microprocessors, which are deemed most suitable. In the flowcharts described hereinafter, exemplary software routines are illustrative of the processing of the invention, but not necessarily of the individual steps of the program in any given embodiment of the invention.

Figures 3A, 3B:
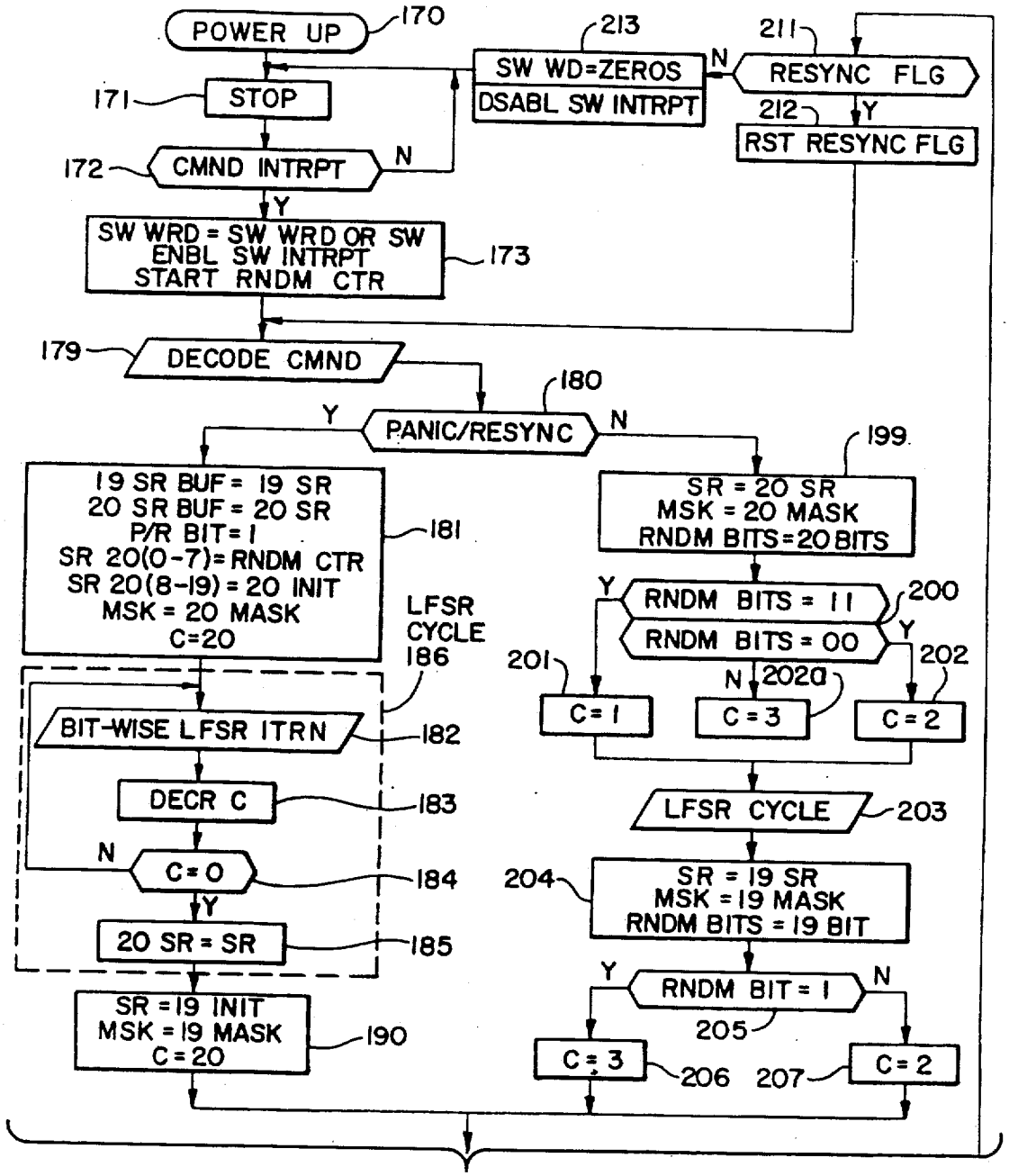
FIG. 3 is a logic flow diagram of a transmitter encryption routine according to the invention.
Figures 3A, 3B:
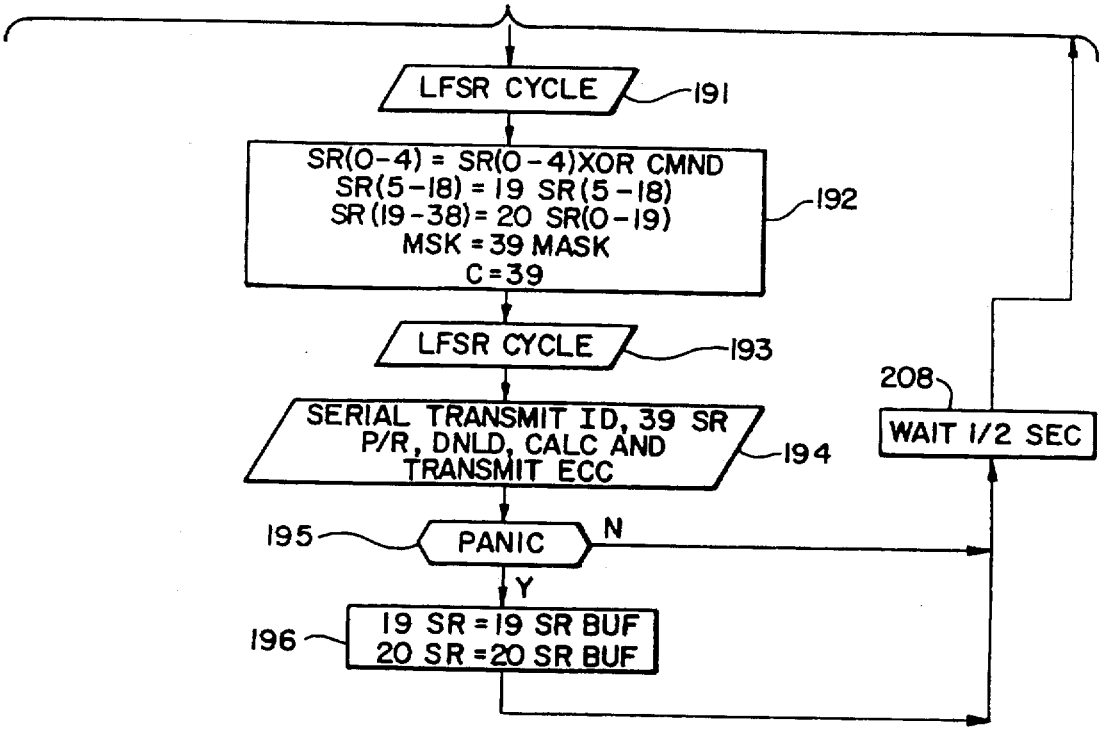

The process of encryption in the fob is illustrated in FIG. 3. It is assumed that the fob comprises a microprocessor, such as a 68HC11, which has a stop mode in which the clock is stopped, the power consumption is negligible, and the only thing the processor can do is to respond to an external interrupt to get started again. In such a processor, application of battery power would cause the program to be reached through a power up entry point 170 and the processor would immediately stop at a step 171 where the only function is to perform a test 172 to determine whether any of the buttons 12–15 have been pressed, or not. So long as no button is pressed, the processor waits in a low power stop mode, in the loop 171, 172. As soon as a key is pressed, an affirmative result of test 172 reaches steps 173 in which a switch word in RAM 20 is ORed with the one of the switches which was pressed. Generally, two switches cannot be pressed within a few computer clocks of each other, so the first one will be sensed. As described hereinafter, if a second one is pressed within about ½ to one second, it will be treated as paired-up with the first; if the two are correct (e.g., lock and unlock) a resynch command is declared. A switch interrupt, selectively enabled during normal command cycles only, allows sensing the second switch of a resynch.

In FIG. 3, the steps 173 also enable the switch interrupt and start the random counter. Then, a decode command subroutine 179 is performed and a test 180 determines if the command is either panic or resynch. If so, an affirmative result of test 180 reaches a series of steps 181 in which the shift register contents are saved in buffers, the panic/resynch (P/R) bit on line 81 is set to 1; a working register, herein referred to as a "shift register" (SR), is set with the random counter in its low order 8 bit positions and with the higher order bit positions equal to a 12 bit secret initial value for the 20 bit LFSR, the mask associated with the SR is set equal to the 20 bit secret feedback mask from the PROM 19, and a cycle counter C is set to 20 iterations. Then a bitwise linear feedback shift register iteration subroutine 182 is performed in which each bit is shifted to the next higher order position, with or without inversion, dependent upon the secret mask and/or whether the low order bit position has a 1, as described hereinbefore. Then the C counter is decremented in a step 183 and a test 184 determines if a complete, 20 iteration LFSR cycle has yet occurred. If not, another iteration is performed by the subroutine 182 and the C counter is decremented again. After 20 iterations, an affirmative result of the test 184 reaches a step 185 where the 20 bit shift register storage location in RAM 20 is set equal to the content of the working shift register. The steps and test 182–185 comprise an LFSR cycle 186.

Then the 19 bit shift register 54 is prepared in a series of steps 190 in which the content of the shift register is set equal to the content of the 19 bit secret initial value in the PROM 19, the mask associated with the shift register set equal to the 19 bit secret feedback mask in the PROM 19, and the C counter is set equal to 19. Then an LFSR cycle subroutine 191 (similar to the subroutine 186) is performed. Then the 39 bit shift register 69 is prepared for its LFSR cycle in a series of steps 192. Specifically, the 5 low order bit positions are the exclusive OR of the command with the 5 low stages of the 19 bit shift register 54; the high 14 bits of the 19 bit shift register 54 are placed directly in the 39 bit shift register; and the highest order 20 bit positions are set equal to the 20 bit positions of the 20 bit shift register 53. The mask is set equal to the secret feedback mask for the 39 bit shift register, found in the PROM 19, and the C counter is set to 39. Then, an LFSR cycle subroutine 193 is performed, this time with 39 iterations, and the result restored in the 39 bit shift register embodied in the scratch pad memory 20. In a routine 194, the 16 bits of the fob ID from the PROM 19, the 39 encrypted bits now in the 39 bit shift register, the P/R bit, and the download bit are all transmitted serially while the calculation for error correcting code bits is performed. These are calculated and transmitted, to complete the process of a panic or resynch command transmission. Whether it be a panic or a resynch is determined by the status of the five command bits. If a resynch was performed, the new values of the 20 bit shift register and 19 bit shift register will be retained as the pseudorandom starting words to be used for future authentication of transmissions to the receiving module. But if this is a panic command, the new values are only used to ensure synchronized response, one time, and a test 195 causes the previous values of the 20 bit and 19 bit shift registers to be restored from the buffers in a step 196.

Assuming that a normal command has been given a negative result of the test 180 reaches a series of steps 199 in which the working shift register is set equal to the 20 bit shift register in the RAM 20 (not the secret initial value), so as to take advantage of the pseudorandom number generated by all of the previous iteration. The mask for the shift register is set equal to the 20 bit shift register secret feedback mask from the PROM 19, and a set of random bits (which determines how many iterations are to be performed, similar to the gates 64 of FIG. 1) is set equal to whatever random bits have been selected to be used to control the iterations for the 20 bit shift register. This might, for instance, be the third and the ninth bit of the 20 bit shift register, or in a general case, can be anything else that is deterministically computable but difficult to predict. Then a pair of tests 200 determines what the random bits are: if both are a 1, a step 201 sets the C counter to 1; if both are a 0, a test 202 sets the C counter to 2. But if they are different, a step 201a sets the C counter to 3. Then, either a 1 iteration, 2 iteration or 3 iteration LFSR cycle subroutine 203 is performed. This aspect of the invention may be used in prior art systems, such as in the Hill et al patent. Next, the same sort of operation is accomplished with the 19 bit shift register; a series of steps 204 set the working shift register equal to the content of the 19 bit shift register in the ram 20, the mask for the working shift register is set equal to the secret feedback mask for the 19 bit shift register in the PROM 19, and the random bit is set equal to whatever bit has been chosen to be random for the 19 bit shift register. Then a test 205 determines if the random bit is 1, or not. If it is, a step 206 sets the C counter to 3, and otherwise a step 207 sets the C counter to 2. This provides four iterations (201, 206; 202, 207) whether the random bit is 1 or 0; but it may be set in other ways, if desired. Then a 2 or 3 iteration LFSR cycle subroutine 191 is performed. Then the series of steps 192 set things up so as to form the 39 bit encrypted word, a 39 iteration LFSR cycle subroutine 193 is performed so as to produce the 39 bit encrypted word, and the subroutine 194 transmits all the bits together with a calculated error correction code. Thus, the differences between encrypting and transmitting normal commands and the panic/resynch command are the setting of the P/R bit, the use of the random counter 145, the use of the secret initial values and the particular code which is exclusive ORed into the 19 bit shift register 54.

When a command word has been transmitted by the subroutine 194, and if a panic command, the shift registers have been restored from the buffer, the program advances to a one-half second wait in a step 208. This is to ensure that successive button pressings which are independent of each other will occur no closer than one-half second apart. During the time from when the computer was awakened by a command interrupt (at test 172 until the end of the one-half second waiting period at step 208), a switch interrupt might have occurred as a result of a second pressing of one of the switches 12–15. As described hereinbefore, this is most likely the case of an attempt to press two switches at once (such as lock and unlock) to thereby cause a resynch. Whenever the switch interrupt is enabled, closing of one of the switches 12–15 will reach the interrupt subroutine of FIG. 4 through an entry point 209. In a series of steps 210, the particular switch which caused the present interrupt is remembered by being ORed into the switch word within the RAM 20; and since this may be a request for resynchronization, an internal resynch flag is set. The random counter is stopped, to provide the random number which is used in resynchronization, and then whatever part of the program of FIG. 3 was in process when the interrupt was sensed is returned to; this return may be to any of the functional steps ahead of the waiting step 208, or may be within the waiting step 208. Of course, if the waiting step 208 is interrupted, it will in fact turn out to be more than one-half second when the counting therefor is completed; this is irrelevant.

In FIG. 3, after the waiting period is over, a test 211 determines if the resynch flag has been set. If it has, an affirmative result of test 211 reaches a step 212 which resets the resynch flag, and then the program advances to the decode command subroutine 179. If the first switch which was pressed, turning on the computer, was either lock or unlock, and the second switch which was pressed, causing the switch interrupt, was either unlock or lock, respectively, then the decode command subroutine will in fact decode a resynch command, to cause a resynch operation of the type described hereinbefore. If not, any other two-key series may be decoded into a lock command for security, or into a panic command since the panic command will not affect security, or it could cause reversion to the one-half second waiting period, at step 208, or otherwise as suits any particular implementation of the invention. Of course, if two switches which can cause a resynch command are pressed essentially simultaneously, the decode command subroutine will decode a resynch command without the aid of FIG. 4 and the resynch flag. If switches are repetitively pressed at less than half-second intervals, the switch word will either contain gibberish or will simply repeat the resynch command.

After waiting one-half second at the step 208, if the resynch flag has not been set, a negative result of test 211 will cause a pair of steps 213 to return the switch word to all zeros and to disable the switch interrupt, so that all future operation of the switches can only turn on the computer from its stop condition, at test 172. It should be noted that the command interrupt and the switch interrupt respond to the same thing: the operation of any of the switches; the difference is the microprocessor's response to them, as is well known in the art.

Figures 4, 5, 6, 7:
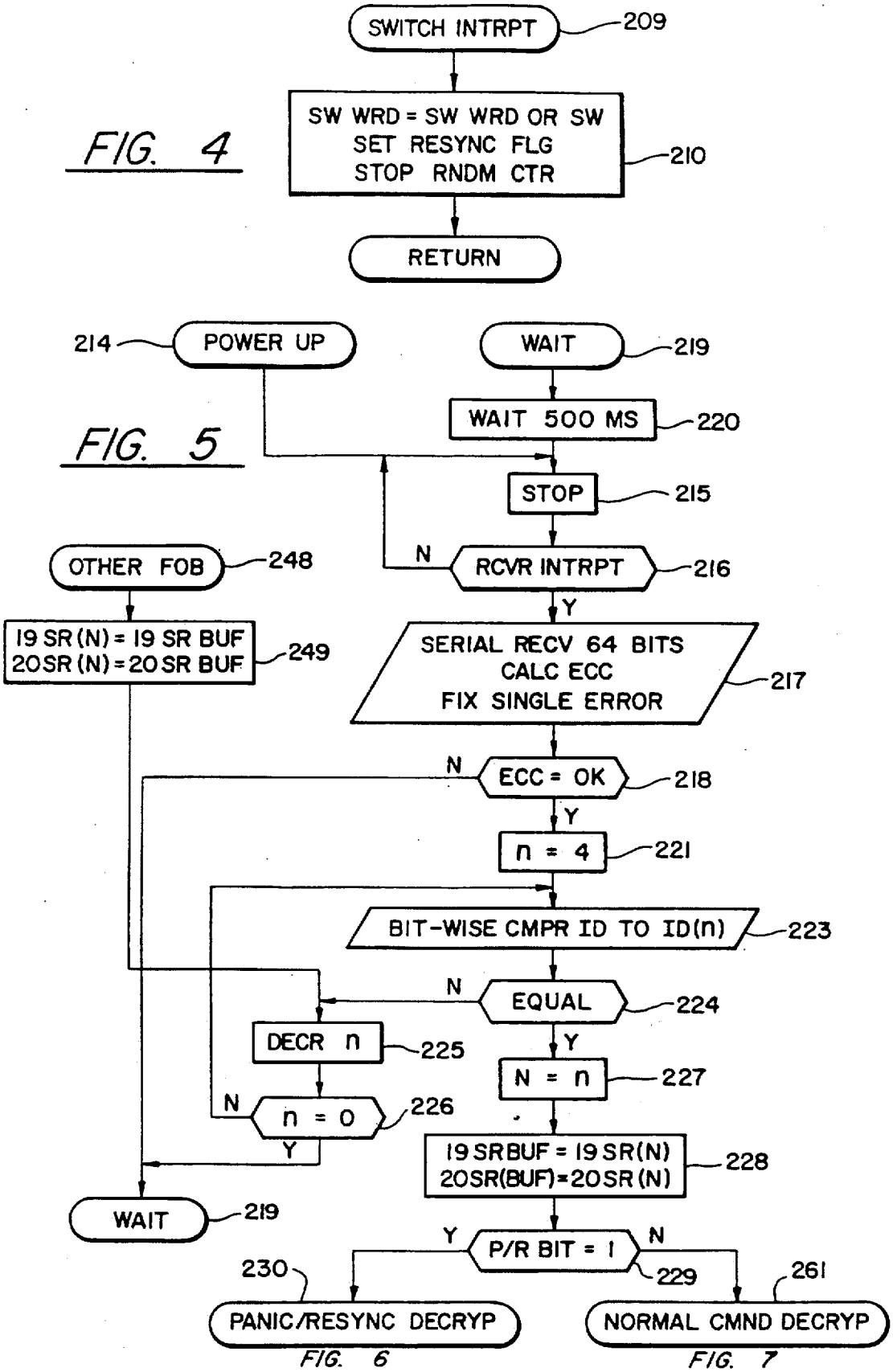
FIG. 4 is a logic flow diagram of a switch interrupt subroutine which may be utilized in the present invention.
FIG. 5 is a logic flow diagram of a first portion of a receiver decryption routine according to the invention.
FIG. 6 is a logic flow diagram of a panic command or resynch command portion of a decryption routine according to the invention.
FIG. 7 is a logic flow diagram of a normal command authentication portion of a decryption routine according to the invention.
Figures 5, 7:
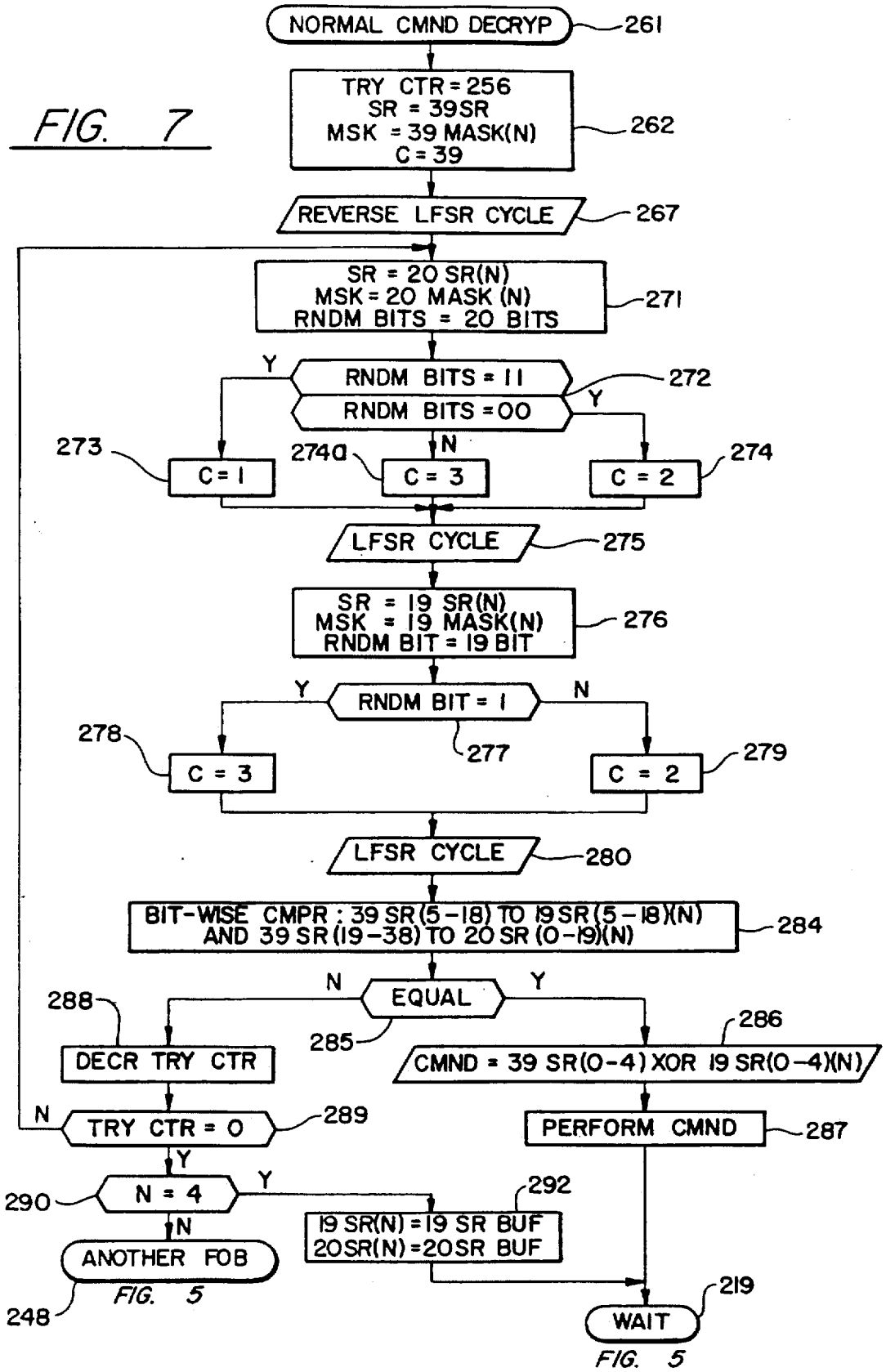

It is assumed that the decryption of FIG. 5 is carried out in a microprocessor of the same general type as is used in the fob. When connected to a battery, the routine is entered through a power up transfer point 214 and the processor immediately goes into a stop mode at a step 215, where the clock is off and the only function is to respond to a receiver interrupt at a test 216. In between usages, the processor in the automobile will remain in the stop mode, in the loop 215, 216. When an incoming message is sensed, an affirmative result of the test 216 will reach a subroutine 217 which handles receiving all 64 bits of the word transmitted from a fob, calculating the error correcting code, and fixing any single error which can be fixed. Then a test 218 determines if the error correction code indicates correct data. If it does not, a negative result of test 218 reaches a transfer point 219 and then a step 220 where the program just waits for half of a second. The purpose of this is to severely hamper any attempts to break the code through repetitive application of numbers, with or without calculated likely candidates. After waiting one-half second, the processor returns to the stop mode in the loop 215, 216.

If the incoming word is OK, an affirmative result of test 218 reaches a step 221 where a working number, n, is set equal to 4 (or to such other number as the number of fobs which can be associated with the automobile). Then, a subroutine 223 compares all the bits of the incoming ID number to all the bits of the ID number for fob 4. If they are not equal, a negative result of a test 224 will reach a step 225 where n is decremented and a test 226 determines if all of the fobs have been checked or not. If they have, that means a signal has been received from a fob of another automobile by accident, or from some other unauthorized sources.

Therefore, an affirmative result of test 226 is taken to be a failure, and the wait step 220 is reached through the wait transfer point 219. Otherwise, the ID of another fob is checked in the subroutine 223. Assuming that the ID number matches for one of the fobs, another working number, N, is set equal to n so as to identify the words in the PROM and RAM needed for decryption, in a step 227. Since the received word may relate to a fob other than fob N, but having the same ID number, the shift register values for fob N are saved in a buffer, in a pair of steps 228, so they may be restored if authentication fails. This is also necessary since if a panic operation has been commanded, the iterations of the shift registers continue in a normal fashion, after performing the panic command. Then a test 229 determines if the P/R bit was present in the incoming word, or not. If it is present in the incoming word, the panic/resynch decrypt routine of FIG. 6 is reached through a transfer point 230.

In FIG. 6, the first steps 232 set a main working shift register (SR) and its mask equal to the secret initial value and the secret feedback mask for the 19 bit LFSR, respectively, from the PROM 40 for the selected fob N, and a C counter is set equal to 20 so as to cause 20 iterations. Then, a 20 iteration LFSR cycle subroutine 233 is performed on the 19 bit shift register. It is assumed that the 39 bit encrypted word portion of the 64 bit received word 38 is stored immediately in a 39 bit shift register location within the RAM 41, which is where it now can be found. Then the 39 bit encrypted word, in the 64 bit word 38, and the 39 bit secret mask for the fob N are provided to the shift register and the C counter is set for 39 iterations, in step 234. Then, a bitwise reverse LFSR iteration subroutine 235 is performed which looks at the low order bit to determine whether the bits corresponding to the mask should be flipped before they are shifted to the next lower order position in the shift register to reconstitute the original word prior to encryption. After each iteration, the C counter is decremented in a step 236 and when all 39 iterations have been performed, an affirmative result of a test 237 will reach a step 238 wherein the content of the working shift register is stored in the 39 bit shift register in RAM 41. The steps and tests 235–238 comprise a reverse cycle subroutine 239, which recovers the initial unencrypted value of the concatenation in the 39 bit shift register 69 in the fob.

Bits 19–38 of the decrypted 39 bit shift register are now loaded into the working shift register in steps 242, the rusk for the shift register is set equal to the 20 bit secret feedback mask for fob N from the EE PROM 40, and C is set equal to 20, and a 20 iteration, reverse LFSR cycle subroutine 243 is performed to recover the combined word (initial value plus random). In a subroutine 244, there is a bitwise comparison of the 39 bit shift register bits 27–38 with the twelve bits of the 20 bit secret initial value for fob N, from EE PROM 40, and of bits 5–18 of the 39 bit shift register with bits 5–18 of the 19 bit shift register for fob N, which are found in the RAM 41. This is equivalent to the comparison of the 12 high order bits an the trunk of lines 160 with those on the lines 161 and of the 14 bits on the line 128 with the 14 bits on the lines 129, in FIG. 2. If these are not equal, the decryption is unsuccessful, the attempted access is a failure, and a negative result of a test 246 will reach a test 247 to see if another fob could match the ID; if it might, FIG. 5 is reverted to through a transfer point 248, the shift registers for fob N are restored from the buffers in steps 249 (FIG. 5), and the process is repeated for another fob. If all fobs have had their ID's checked, the routine reaches a pair of steps 250 where the shift registers for fob N are returned to their former values, and the program enters the half second wait at step 220 through the transfer point 219.

If the comparison is successful, indicating partial authentication, an affirmative result of test 246 reaches a subroutine 252 where the value in the command register 138 is set equal to the exclusive OR of the low order bits of the 39 bit shift register and the low order bits of the 19 bit shift register, both taken from the RAM 41. Then, a test 253 determines if the panic/resynch bit was established in response to a resynch command. If not, the panic command is performed by tuning on the lights, horn, or other alarm of the automobile in a step 254. Then, the shift registers for fob N are restored in the steps 250 and the wait step 220 is reached through the transfer point 219.

If the command were a resynch, a positive result of test 253 reaches a subroutine 255 which compares bits 19–26 of the 39 bit shift register (the regenerated random number) to a queue of previously used random numbers in the first in, first out stack (FIFO) 155, in EEPROM 40. If the random word compares to any of the last four (or whatever size FIFO is chosen) random words in the queue which were used in resynchronization, the resynchronization is deemed to be unsuccessful, since it is assumed that there has been clandestine playback of a copied random word. In such a case, an affirmative result of a test 256 reaches a subroutine 257 that rearranges the FIFO stack by moving the random word from its position in the queue in the FIFO stack to the first position thereof, and adjusting the position of the other words in the queue, without losing any. And, since this is deemed to be an unsuccessful attempt to resynchronize the unit, the old values in the 19 bit and 20 bit shift registers for fob N are restored in the steps 250. Then, the wait step 220 is reached through the transfer point 219.

If the random word did not compare with any word in the FIFO, a complete authentication exists, and a negative result of test 256 reaches a subroutine 258 which rearranges the FIFO for fob N simply by adding bits 19–26 of the 39 bit shift register to the first location in the queue and shifting all the other words downward therein, causing the oldest word to fall out. In this case, the resynch operation is successful, so the steps 250 are bypassed and the setting of the 19 bit shift register for fob N in RAM 20 is left as it was established by the resynchronization operation, at subroutine 233. The 20 bit LFSR word created in the subroutine 243 is placed in the RAM for fob N (step 259), for use en future.

An important aspect of the present invention is that resynchronization occurs only after: 20 iterations of the 19 and 20 bit shift registers from their secret initial values and the random number; performing 39 iterations in the 39 bit shift register with those values, and the exclusive OR of the command; reverse iterations of the 39 bit encrypted word in the receiver module; reverse iteration of the 20 bits which include the secret initial value of the 20 bit shift register and the random counter; generation and successful comparison of the high order bits of the 19 bit shift register; and a failure of comparison of the random word with any of the last four random words used to resynchronize the system. This is quite secure.

Assuming that there is no P/R bit 81 in the 64 bit word which is received, a negative result of test 229 in FIG. 5 will reach the normal command decryption routine of FIG. 7 through a transfer point 261. In the normal command decryption process, the iterated 19 bit and 20 bit words in the RAM 20 are given 1–3 additional iterations and compared with the reverse-processed bits of the 39 bit encrypted word. As described hereinbefore, since the fob may have its buttons pressed when the automobile cannot respond to it, they can become unsynchronized. Each time that a command is received in the receiver module 30, it is allowed 256 cycles to try to iterate to a correct pair of words that will match those which were transmitted to it. If it does so, then the command is responded to, and the iterated values are saved for authenticating the next command. If not, resynchronizaton is required, as described hereinbefore. In order to keep track of how many tries are made, the try counter 143 is set to its maximum count in a first one of a series of steps 262. Then, the working shift register (SR) is set equal to the 39 bit shift register in the RAM 20, which contains the 39 bit encrypted word. The mask for the shift register is set equal to the 39 bit secret feedback mask in the EE PROM 40, the C counter is set equal to 39, and a reverse LFSR cycle subroutine 267 is performed. Then a series of steps 271 cause the contents of the 20 bit shift register for fob N to be loaded from the RAM 41 into the working shift register (SR), the mask for the shift register is set equal to the secret feedback mask for fob N in the EE PROM 40 and a random bit is set equal to whatever bit or bits have been chosen for the 20 bit shift register (as described with respect to steps 199 in FIG. 3). Then the random bits are tested in a pair of steps 272, and if both are a 1, the C counter is set equal to 1 (step 273), if both are a 0, the C counter is set equal to 2 (step 274), and otherwise the C counter is set equal to 3 (step 274a). Then, an LFSR cycle subroutine 275 is performed. Then a series of steps and tests 276–279 prepare to run an LFSR cycle subroutine 280 for the 19 bit shift register in a similar fashion. Then a subroutine 284 does bit-by-bit comparisons of the 39 bit shift register to the 20 bit shift register and to the high order bit positions of the 19 bit shift register, for fob N. If all the bits are equal, an affirmative result of a test 285 causes the particular command to be found by exclusive ORing the 5 low order bits in a subroutine 286 and the command is performed in a step 287, such as locking or unlocking the door, or releasing the trunk lid. But if the bits do not compare, a negative result of test 285 reaches a step 288 where the try counter is decremented and a test 289 to determine if 256 tries have been made yet. If not, another pair of iterations 275, 280 are performed and compared. This goes on until the receiver module 30 catches up with the fob 16 (if it can). If after 256 tries, a comparison has not been reached, an affirmative result of test 289 will reach a test 290 to see if all the fobs have been given consideration. If not, the restoration steps 249 (FIG. 5) are reached through the transfer point 248. Otherwise, the shift registers for fob N are restored to their starting values in steps 292 and the program reverts to the wait step 220 (FIG. 5) through the transfer point 219.

Figure 8:
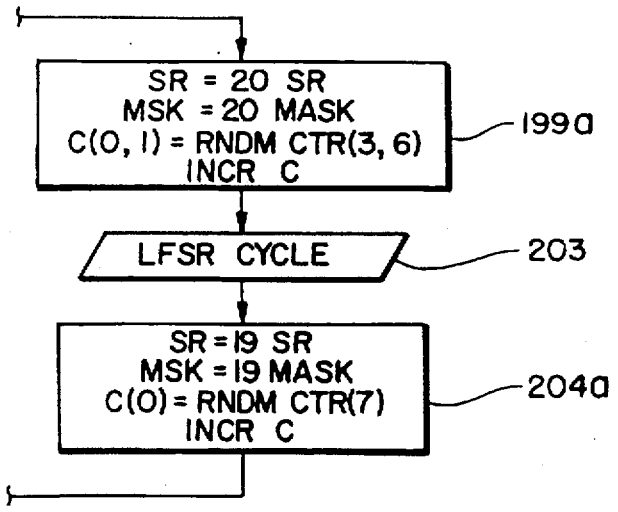
FIGS. 8 and 9 are logic flow diagrams of alternative routines for pseudorandom iterations.
Figure 9:
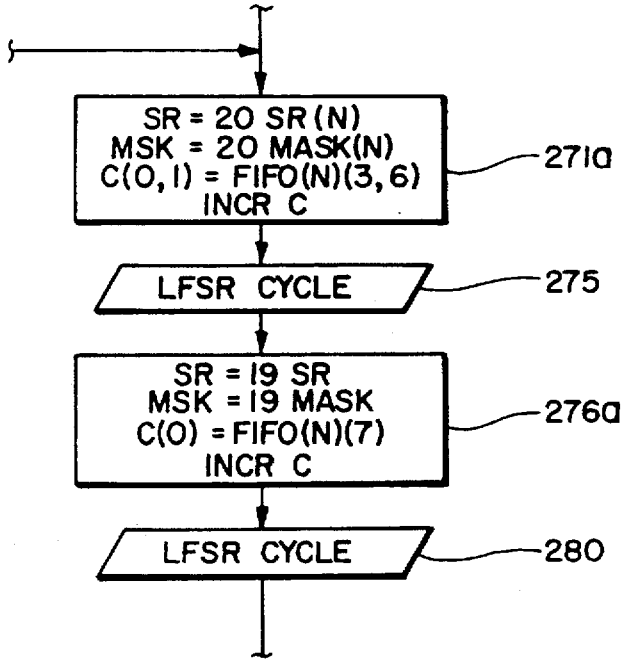

In FIG. 8, an alternative random iteration utilizes a pair of bits from the random counter to determine the number of iterations of the 20 bit shift register operation and one bit thereof to determine the number of iterations in the 19 bit shift register operation. In a set of steps 199a (m place of steps and tests 199–202a, FIG. 3), the cycle counter, C, has its two low ordered bit positions (0, 1) set equal to the selected bits (3 and 6 in this example) of the random counter, and it is incremented to ensure that a zero-valued pair of bits will not result in no iteration. Similarly, steps 204a replace steps and test 204–207 to provide one or two iterations in the 19 bit operation. In FIG. 9, the random number is found at the head of the queue in the FIFO memory (40) for fob N. Steps 271a replaces steps and tests 271–274a and steps 276a replace steps and tests 276–279. In this embodiment, the number of iterations in each case is one higher (1–4; 1 or 2) than the value of the bit or bits (taken together as low ordered bits) selected from the random counter. However, fewer choices of the number of iterations may be used in response to random counter bits, as in tests 200 and 272, or by means of any other decode. Of course, more bits and higher numbers may be used.

In a system which uses only one or two fobs, or in which speed of response is not important, the present invention may be utilized without the use of ID numbers, simply by trying all of the sets of stored shift register words and masks; this would make the system subject to more nuisance iterations since the ID number would no longer screen out many transmissions from similar, unauthorized systems. And there must be some sort of a tag to correlate the generated pseudorandom words with the correct feedback mask for subsequent iterations, as well as with the correct initial value. This may be achieved by arbitrary numbering of the various sets of initial values and masks and corresponding registers for storing the iterated words.

The various number of iterations used during synchronization may be the same (e.g., 20, or more) for both random words generated from initial values, or they may be different (e.g., 20 and 19, or more).

As used herein, the term "encryption" inherently defines a process capable of decryption. Thus, if the process of encryption employs a pseudorandom number generation operation of any type, that generation operation must be capable of being practiced in reverse, such as the reverse LFSR operation utilized herein. The encryption processes and operations used herein may be any of those described hereinbefore by way of example, and others. However, the LFSR pseudorandom number generation operation is one of the easier ones to understand, and probably the simplest to implement in dedicated or quasi-dedicated hardware. That is, if the signal processing means of the invention includes dedicated shift registers and the like as may be implied in FIGS. 1 and 2, the LFSR form of encryption may be preferred. Similarly, if the signal processing means of the present invention is implemented with microprocessors having suitable program routines as disclosed in FIGS. 3–7 herein, the advantage of LFSR operations over other forms of encryption may be less distince. The term "encryption" is, therefore, used herein in its broadest sense, so long as the word which becomes encrypted can be recovered through decryption.

In the foregoing embodiments, secret initial values and secret feedback masks for generating maximal length sequences of pseudorandom numbers are essentially unique to each transmitter, but not necessarily totally unique. By this it is meant that the sets of two secret initial values and three secret feedback masks, taken together, are capable of distinguishing more vehicles than are made in a lifetime; however, the method of assignment, or human error or design, could result in some few with the same set of numbers. Within this definition, however, it is quite possible that several transmitters will have the same 19 bit secret initial value and/or the same 20 bit secret mask, or other similar combinations. In contrast, the use of a 16 bit identification number means that there will be several fobs each year possibly having the same identification number (but not the same secret values) so that over a course of time, there could be many fobs (such as about 5,000 fobs in the USA over a 10-year period for each possible identification number). Within statistical probability, it is possible that as many as one out of 10,000 automobiles having four fobs each may have two fobs with the same identification number. It is an important aspect of the present invention, that even if one fob having a correct identification number is not authenticated within 256 tries (or whatever is used), it will nonetheless try any other fob that may have the same ID number. If trying three or four fobs results in too much delay, the last tried fob is likely to be reported as faulty, and a new fob issued, with very minuscule likelihood that the new fob would have the same identification number as the remaining fobs in the set.

Although the present invention employs only lock-related commands, the panic alarm command, and synchronization command, it should be understood that the invention can be utilized to authenticate conveyance of any information in the form of bits similar to the command bits herein. Thus, in its broadest sense, the term "lock-related command" means the conveying of other than a synchronization command, the conveyance of which is to be authenticated; this may then be thought of as a command apart from the internal functioning of the system itself.

In the present embodiment, each encryption (such as the 19 bit, the 20 bit and the 39 bit shift register encryptions) are the same linear feedback shift register pseudorandom number generation). However, they need not all be the same, and in fact can be different algorithms to further confuse any attempted analysis. Similarly, the number of bits in the shift registers can be whatever is desired. In all cases, the greater number of bits, the harder to break the code by analysis. The numbers used herein provide a safe system, but greater or fewer numbers of bits may be chosen in practicing the invention if desired. Similarly, the words may be considered to be single words, or double words in the sense that the 19 bit shift register produces one portion of 14 bits which is used for cryptographic authentication, and another portion which carries the command but is not used in cryptographic comparison for authentication. These portions can be considered to be two different words except for the fact that in the embodiment herein they are generated in the same process. Of course, separate processes could be used, or two processes of a different split of numbers of bits could be used to encrypt and iterate the encryption of the word in which the command bits are found. For instance, in place of a single 19 bit shift register operation, a 10 bit shift register operation and a 9 bit shift register operation could be utilized, the results thereof concatenated, and five command bits exclusive ORed into a portion of one of them, before being used in the final encryption.

The invention may use more than two concatenated words in the final encryption, such as an additional word or such as having three words, each slightly smaller than the two words used in the final 39 bit encryption herein.

The invention is disclosed as being employed in system in which the transmitter transmits to the receiver, but the receiver does not transmit back to the transmitter. However, the precepts of the present invention can be used singularly, or in combinations in systems which, for one purpose or another, employ bilateral communications between the two units. Aspects of the invention may then be used to authenticate transmissions in both directions, or only in one direction, as is necessary. Although the invention is disclosed herein, and nay find its greatest utilization, in a remote authentication system, it may as well be used in a system in which the transmitter is connected by a conductor to the receiver, so as to provide secure operation between the two. Similarly, aspects of the invention may be utilized in contact embodiments, such as in electronic keys, so as to provide insurance against the temptation of insiders to perform a clandestine system breach, as well as protecting against outsiders compromising the system.

In the disclosed embodiments, the 20 bit shift register operation may employ one through five iterations, dependent upon the random occurrence of a pair of bits within the register, or a pair of random bits. Similarly, the 19 bit shift register operation may employ one through three iterations, depending upon one of its bits or a random bit. In the general case, these numbers may as well be reversed, they may be the same, they may depend on each other or on any pseudorandom events that can be duplicated in the receiver, and/or either of them may be greater, provided that time constraints do not prohibit a greater number of iterations, and that every possible condition results in at least one iteration. It is to be noted that the small number of iterations would not be important but for the fact that in any given transmission, the receiver is allowed up to 256 attempts to catch up, iteratively, to the encryption process for the given transmitter (or for several transmitters). There is even more flexibility when the variable iterations are used in a pseudorandom number generator in other than transmitter/receiver environments (such as in computer processes).

As disclosed, the present invention uses a one-half second waiting period in order to foil attempts to use a brute force, exhaustive numerical trial method of compromising the system. This is a period of time, for the exemplary numbers herein, which assures that the expected time for success (the time to yield a 50% statistical chance of success) is longer than one month. However, different periods of time may be used in the receiver, dependent upon the need to be responsive to the customer. This should not be confirmed with governmental limitations on transmitting more than one message in each half second, or the like.

Thus, although the invention has been shown and described with respect to exemplary embodiments thereof, it should be understood by those skilled *in* the art that the foregoing and various other changes, omissions and additions may be made therein and thereto, without departing from the spirit and scope of the invention.

We claim:

1. A method of cryptographic authentication of transmissions from a transmitting unit to a receiving module, comprising, in said transmitting unit:

separately generating a plurality of pseudorandom numbers;

concatenating said numbers to form a combined word;

performing an encryption operation on said combined word; and transmitting a command word including a key portion derived from the result of said encryption operation; and comprising, in said receiving module:

receiving said command word;

performing a decryption operation on the key portion of said command word to recover said combined word;

providing at least one number; and providing an authentication signal only if at least a portion of said at least one number is identical to a corresponding portion of said recovered combined word.

2. A method according to claim 1 wherein:

said step of providing at least one number comprises separately generating a second plurality of pseudorandom numbers; and said step of providing an authentication signal comprises providing said authentication signal only if at least a portion of each of said second plurality of pseudorandom numbers is identical to a corresponding portion of said recovered combined word.

3. A method according to claim 2 wherein said generating steps each comprise generating a pair of numbers.

4. A method according to claim 1 wherein said generating step comprises generating a pair of numbers.

5. A method according to claim 1 wherein said step of performing an encryption operation comprises performing a linear encryption operation.

6. A method according to claim 1 wherein said step of performing an encryption operation comprises performing a feedback shift register operation.

7. A method according to claim 6 wherein said step of performing an encryption operation comprises performing a linear feedback shift register operation employing a secret feedback mask and said step of performing a decryption operation comprises performing a reverse linear feedback shift register operation employing the same secret feedback mask as in said encryption operation.

8. A method according to claim 7 wherein said linear feedback shift register operation comprises a number of iterations on the order of the degree of said combined word or more.

9. A method of cryptographically authenticating a transmission from a transmitting unit to a receiving module, comprising:

providing a starting number in said transmitting unit and providing said starting number in said receiving module;

in said transmitting unit:

providing [an] *a first* iteration control signal which changes in a pseudorandom manner in response to successive transmissions from said transmitting unit;

performing a variable number of iterations of an iterative encryption operation on said starting number, said variable number determined by said iteration control signal;

transmitting a command word derived at least in part from the result of said encryption operation; and in said receiving module receiving said command word;

recovering the result of said encryption operation from said received command word;

providing a second iteration control signal which changes, in the same pseudorandom manner as said first iteration control signal, in response to successive receptions of command words by said receiving module;

performing a variable number of iterations of said iterative encryption operation on said starting number, said variable number determined by said second iteration control signal;

comparing at least a portion of the result of said encryption operation performed in said receiving module with a corresponding portion of said recovered result; and providing an authentication signal only if said portion of said encryption operation performed in said receiving module is identical to said corresponding portion of said recovered result.

10. A method according to claim 9 wherein said step of performing an iterative encryption operation comprises performing a linear iterative encryption operation.

11. A method according to claim 9 wherein said step of performing an iterative encryption operation comprises performing a feedback shift register operation.

12. A method according to claim 9 wherein said step of performing an iterative encryption operation comprises performing a linear feedback shift register operation employing the same secret feedback mask in said transmitting unit as in said receiving module.

13. A method according to claim 9 wherein:

the same [secret initial value] *starting number* is provided in said transmitting unit and in said receiving module; and said starting number is provided by performing said iterative encryption operation on a word derived at least in part from said secret initial value a number of iterations on the order of the degree of said word, or more.

14. A method according to claim 9 wherein said variable number of iterations is a fraction of the degree of said starting number.

15. A method according to claim 9, comprising:

providing a second starting number in said transmitting unit and providing said second starting number in said receiving module;

in said transmitting unit:

providing a third iteration control signal which changes in a pseudorandom fashion in response to successive transmissions from said transmitting unit;

performing a changeable number of iterations of an iterative encryption process on said [third] *second* starting number, said changeable number determined by said third iteration control signal;

transmitting said command word derived at least in part from the result of said encryption process; and in said receiving module:

recovering the result of said encryption process from said received command word;

providing a fourth iteration control signal which changes, in the same pseudorandom fashion as said third iteration control signal, in response to successive receptions of command words by said receiving module;

performing a changeable number of iterations of said iterative encryption process on said starting number, said changeable number determined by said fourth iteration control signal;

comparing at least a portion of the result of said encryption process performed in said receiving module with a corresponding portion of said recovered result of said encryption process; and providing an authentication signal only if said portion of said encryption process performed in said receiving module is identical to said corresponding portion of said recovered result of said encryption process.

16. A method according to claim 15 wherein said variable number is different from said changeable number.

17. A method according to claim 15 wherein said pseudorandom manner is different from said pseudorandom fashion.

18. A method according to claim 15 wherein said iterative encryption operation is the same as said iterative encryption process.

19. A method according to claim 9 wherein, in response to the presence of said first and second equal signals, the command portion of said recovered new altered word is exclusive ORed with the corresponding portion of said second new pseudorandom number and said steps (a) and (b), are performed in response to the result of said exclusive OR operation indicating said command is a synchronization command.

20. A method according to claim 9 wherein said iteration control signal changes in response to the value of a bit position of a changing number.

21. A method according to claim 9 wherein said iteration control signal changes in response to the value of a plurality of bit positions of a changing number.

22. A method according to claim 9 wherein said iteration control signal changes in response to the value of a bit position of said starting number.

23. A method of cryptographically authenticating transmissions from any of a plurality of remote command transmitting units to a command performing receiving module, comprising:

providing a set of numbers in each of said transmitting units, each set corresponding to one of said transmitting units, each set including at least one secret initial value, each set essentially unique to the corresponding unit;

providing in said receiving module, said set of numbers for each of said transmitters to which said receiving module is to respond;

transmitting a command word from one of said transmitting units including a key portion derived at least in part from an encryption operation performed on said secret initial value; and authenticating said command word received at said receiving module utilizing the numbers in a corresponding set.

24. A method according to claim 23 wherein each of said sets includes an identification number;

said transmitting step comprises transmitting said command word including said identification number; and said authenticating step comprises performing a process to authenticate said received command word only in response to said command word containing an identification number which matches an identification number in one of the sets provided in said receiving module.

25. A method according to claim 24 wherein, in response to receipt of said command word, said receiving module performs an authentication process using successive ones of said sets which have an identification number that matches the identification number included in said received command word until either authentication occurs or all of said sets have been used.

26. A method according to claim 23 wherein, in response to receipt of said command word, said receiving module performs an authentication process on said key portion using successive ones of said sets until either authentication occurs or all of said sets have been used.

27. A method according to claim 23 wherein each set includes at least one corresponding secret feedback mask, and said encryption operation comprises a feedback register pseudorandom number generation operation utilizing said secret feedback mask.

28. A method according to claim 27 wherein said shift register operation is linear.

29. A method of synchronized cryptographic authentication of transmissions from a remote command transmitting unit to a command performing receiving module selectively responsive thereto comprising:

transmitting a command word including a key portion derived from at least one encrypted number generated in said transmitting unit and indicative of a command;

receiving said command word and, in response thereto, comparing a number in said receiving module with a number decrypted from the key portion recovered from said command word, providing an authentication signal based at least in part on identity between said number in said receiving module and said number decrypted from the key portion recovered from said command word, selectively performing the command indicated thereby in response to said authentication signal; and rendering said receiving module unresponsive, following receipt of one command word, to receipt of an additional command word for a period of time on the order of one-half second, or more.

30. The method according to claim 29 wherein said rendering step comprises providing a waiting period between the conclusion of any operation responsive to receipt of one of said command words and the enabling of said receiving module to be responsive to a subsequently received command word.

31. A method of selectively cryptographically authenticating transmissions, indicative of commands initiated by operating switches, from each of a plurality of transmitting units to a receiving module, comprising:

providing a set of numbers in each one of said transmitting units, each set corresponding to one of said transmitting units and identified by an identification number, each set including at least a pair of secret initial values;

providing in said receiving module the one of said sets corresponding to each of said transmitting units to which said receiving module is to respond, *the one of said sets having a first and second receiver secret initial value*;

in response to operation of said switches indicating a command other than a lock-related command in one of said transmitting units:

providing a command bit;

generating a random number;

concatenating said random number with a first one of said secret initial values so as to provide a combined word;

performing a first encryption operation on said combined word to provide a first number;

performing a second encryption operation on a second one of said secret initial values to provide a second number;

exclusive ORing a plurality of command bits indicative of said command with the corresponding bits of said second number to provide an altered word;

performing a third encryption operation on the concatenation of said first number with said altered word to provide an encrypted key word;

storing said first and second numbers as first and second pseudorandom numbers for future use in subsequent authentication;

transmitting a command word including said encrypted key word, said command bit, and said identification number;

in response to operation of said switches indicating a lock-related command in one of said transmitting units:

performing a fourth encryption operation on said first number to provide a new first pseudorandom number;

performing a fifth encryption operation on said second number to provide a new second pseudorandom number;

exclusive ORing a plurality of command bits indicative of said lock-related command with the corresponding bits of said new second pseudorandom number to provide a new altered word;

performing a sixth encryption operation on the concatenation of said new first pseudorandom number and said new altered word to provide a new encrypted key word;

storing said new first and second pseudorandom numbers for future use in subsequent authentication in place of said first and second pseudorandom numbers;

transmitting a command word including said new encrypted key word and said identification number;

in said receiver, selectively, in response to receipt of said command word including said command bit:

determining if said receiver has secret initial values related to the received identification number, and if not, terminating all response to said received word, but if so:

performing a first decryption operation on said key word portion of said received command word so as to recover said first number and said altered word;

performing, on said recovered first number, a second decryption operation so as to recover said combined word, comparing said first *receiver* secret initial value to a corresponding portion of said recovered combined word and providing a first equal signal only in the event of identity therebetween;

performing a seventh encryption operation on said second *receiver* secret initial value to provide said second number, comparing the non-command portion of said recovered altered word with the corresponding portion of said second number and providing a second equal signal only in response to identity therebetween;

then, in response to the absence of either of said first and second equal signals, terminating all further response to said command word;

or otherwise, in response to the presence of said first and second equal signals, comparing the random number portion of said recovered combined word to a random number portion derived from a command word previously received from said transmitter and, in response to identity therebetween, terminating all further response to said command word, but otherwise, (a) storing said random number portion for future use in subsequent synchronization operations and (b) storing said second number and said recovered first number, as first and second pseudorandom numbers for future use in subsequent authentication operations;

in said receiver, selectively, in response to receipt of said command word not including said command bit:

determining if said receiver has *first and second receiver* secret initial values related to the received identification number, and if not, terminating all response to said received word, but if so:

performing a third decryption operation on the key word portion of said received command word, so as to recover said new first pseudorandom number and said new altered word;

performing an eighth encryption operation on said first [pseudorandom number] *receiver secret initial value* to provide a first [new] *receiver* pseudorandom number, and comparing said first [new] *receiver* pseudorandom number to said recovered [new] *receiver* first pseudorandom number and providing a third equal signal in response to identity therebetween;

performing a ninth encryption operation on said second [pseudorandom number] *receiver secret initial value* to provide a second [new] *receiver* pseudorandom number and comparing the non-command portion of said recovered new altered word to a corresponding portion of said second [new] *receiver* pseudorandom number and providing a fourth equal signal only in response to identity therebetween;

then, in the absence of either of said third or fourth equal signals, terminating all further response to receipt of said command word, but in the presence of both of said third and fourth equal signals, exclusive ORing the command portion of said recovered new altered word with the corresponding portion of said second [new] *receiver* pseudorandom number, performing the command indicated by the result thereof, and storing said first [new] *receiver* pseudorandom number and said second [new] *receiver* pseudorandom number for future use in subsequent authentication operations.

32. A method according to claim 31 wherein said encryption operations comprise linear feedback shift register operations.

33. A method according to claim 31 wherein said first, second and third encryption operations employ the same algorithm.

34. A method according to claim 31 wherein said first and fourth encryption operations employ the same algorithm.

35. A method according to claim 31 wherein said second and fifth encryption operations employ the same algorithm.

36. A method according to claim 31 wherein said third and sixth encryption operations employ the same algorithm.

37. A cryptographically authenticated remote control system in which a command transmitting unit selectively causes a physical effect in a command receiving module rendered responsive thereto;

said transmitting unit comprising:

a source of signals for providing first and second seed signals indicative of respective secret pseudorandom number generator initial values and first, second and third mask signals indicative of respective secret feedback masks, each mask defining a respective feedback polynomial for linear feedback shift register pseudorandom number generation, said initial values and said polynomials being essentially unique to said transmitting unit;

command switches operable to indicate a physical effect which is to be caused by said receiving module; and first signal processing means responsive to selected operation of said switches indicative of a synchronization command for providing a random signal indicative of a variable random number, for performing a first linear feedback shift register pseudorandom number generation operation, on a combined number consisting of the initial value defined by said first seed signal concatenated with the random number defined by said random signal, a given number of iterations on the order of the degree of said fist polynomial, or more, using the mask defined by said first mask signal, said first polynomial having a degree on the order of the degree of said combined word, for performing a second linear feedback shift register pseudorandom number generation operation, on a second word consisting of the initial value defined by said second seed signal, a fixed number of iterations on the order of the degree of said second polynomial, or more, using the mask defined by said second mask signal, said second polynomial having a degree on the order of the degree of said second initial value, for exclusive ORing a plurality of command bits indicative of said synchronization command with a corresponding plurality of bits of the result of said second generation operation to form an altered word, for storing, for future use in authenticating subsequent transmissions to said receiving module, first and second pseudorandom numbers respectively indicative of the results of said first and second generation operations, for performing a third linear feedback shift register pseudorandom number generation operation, on a word consisting of said first pseudorandom number concatenated with said altered word, a predetermined number of iterations on the order of the degree of said third polynomial, or more, using the mask defined by said third mask signal said third polynomial having a degree on the order of the summation of the degrees of said first pseudorandom number and said altered word, and for transmitting, to said receiving module, a command word signal having the result of said third generation operation as a key portion and including a command bit indicative of said synchronization operation;

said first signal processing means responsive to selected operation of said switches indicative of a lock-related command for performing a fourth linear feedback shift register pseudorandom number generation operation, on said first pseudorandom number, a first determined number of iterations, using the mask defined by said first mask signal, to provide a new first pseudorandom number, for performing a fifth linear feedback shift register pseudorandom number generation operation, an said second pseudorandom number, a second determined number of iterations, using the mask defined by said second mask signal, to provide a new second pseudorandom number, for exclusive ORing a plurality of command bits indicative of said lock-related command with a corresponding plurality of bits of said new second pseudorandom number to form a new altered word, for performing a sixth linear feedback shift register pseudorandom number generation operation, on a word consisting of said new first pseudorandom number concatenated with said new altered word, said predetermined number of iterations, using the mask defined by said third mask signal, for storing said new first and second pseudorandom numbers for future use in authenticating subsequent transmissions to said receiving module, and for transmitting, to said receiving module, a command word signal having the result of said third generation operation as a key portion;

said receiving module comprising a signal source for providing third and fourth seed signals respectively indicative of said initial values and fourth, fifth and sixth mask signals respectively indicative of said masks; and second signal processing means for receiving said command word signal and responsive to said command word including said command bit, for performing a first reverse linear feedback shift register pseudorandom number generation operation, on said key portion of said command word signal, said predetermined number of iterations, using the mask defined by said sixth mask signal, for performing a second reverse linear feedback shift register pseudorandom number generation operation, on a portion of the result of said first reverse generation operation corresponding to said combined word, said given number of iterations, using the mask defined by said fourth mask signal, for comparing said initial value defined by said third seed signal with an equivalent portion of the result of said second reverse generation operation and providing a first equal signal only if they are identical, for performing a seventh linear feedback shift register pseudorandom number generation operation on a word consisting of the initial value defined by said fourth seed signal, said fixed number of iterations, using the mask defined by said fifth mask signal, for comparing a portion of the result of said seventh generation operation, corresponding to the unaltered portion of said altered word, with a corresponding portion of the result of said first reverse generation operation and providing a second equal signal only if they are identical, in response to said first and second equal signals, for storing, for subsequent use, the random number portion of the result of said second reverse operation and for comparing said random number portion with a similar random number portion, previously stored for subsequent use in response to prior performances of said second reverse operation, and for selectively storing third and fourth pseudorandom numbers respectively indicative of the result of said second reverse operation and said seventh generation operation, for future use in subsequent authentication of transmissions from said transmitting unit, only if said compared random portions are not equal;

said second signal processing means responsive to said command word signal not including said command bit for performing a third reverse linear feedback shift register pseudorandom number generation operation, on said key portion of said command word signal, said predetermined number of iterations, using the mask defined by said sixth mask signal, to recover said new first pseudorandom number and said new modified word, for performing an eighth linear feedback shift register pseudorandom number generation operation, on said third pseudorandom number, said first determined number of iterations, using the mask defined by said fourth mask signal, to provide a third new pseudorandom number with said third new pseudorandom number and generating a third equal signal only if they are identical, for performing a ninth linear feedback shift register pseudorandom number generation operation, on said fourth pseudorandom number, said second determined number of iterations, using the mask defined by said fifth mask signal, to provide a fourth new pseudorandom number, for comparing the non-command portion of said recovered new altered word with a corresponding portion of said fourth new pseudorandom number and providing a fourth equal signal only if they are identical, and, in response to said first and second equal signals, for storing for future use in subsequent authentication of transmissions from said transmitting unit, said new third and fourth pseudorandom numbers indicative of the results of said eighth and ninth generation operations, for exclusive ORing the command portion of said recovered new altered word with the corresponding portion of said fourth new pseudorandom number to recover said plurality of command bits and for performing said lock-related command.

38. A system according to claim 37 wherein the initial value indicated by said first seed signal is different from the initial value defined by said second seed signal.

39. A system according to claim 37 wherein said polynomials are all different from each other.

40. A system according to claim 37 wherein said fixed number is equal to said given number.

41. A system according to claim 37 wherein said first determined number is different from said second determined number.

42. A system according to claim 37 wherein said feedback polynomials are maximal length feedback polynomials.

43. A system according to claim 37 wherein said first and second determined numbers each vary as a function of a respective pseudorandom event, responsive to each transmission in said transmitting unit and responsive to each reception in said receiving module.

44. A system according to claim 43 wherein said first and second determined numbers are a fraction of said given number and said fixed number, respectively.

45. A method of cryptographically authenticating a transmission from a transmitting unit to a receiving module, comprising:

providing a starting number in said transmitting unit and providing said starting number in said receiving module;

in said transmitting unit:

providing an iteration control signal which changes in a random manner in response to successive transmissions from said transmitting unit;

performing a variable number of iterations of an iterative encryption operation on said starting number, said variable number determined by said iteration control signal;

transmitting a command word derived at least in part from the result of said encryption operation; and in said receiving module:

receiving said command word;

recovering the result of said encryption operation from said received command word;

providing a second iteration control signal which changes, in the same random manner as said first iteration control signal, in response to successive receptions of command words by said receiving module;

performing a variable number of iterations of said iterative encryption operation on said starting number, said variable number determined by said second iteration control signal;

comparing at least a portion of the result of said encryption operation performed in said receiving module with a corresponding portion of said recovered result; and providing an authentication signal only if said portion of said encryption operation performed in said receiving module is identical to said corresponding portion of said recovered result.

46. A method according to claim 45 wherein said iteration control signal changes in response to the value of a plurality of bit positions of a random number.

*47. A cryptographically authenticated remote control system in which a command transmitting unit selectively causes a physical effect in a command receiving module rendered responsive thereto,*

*the transmitting unit comprising*

*a first signal generator for providing a plurality of number signals indicative of respective pseudorandom numbers;*

*a signal processor for concatenating the plurality of number signals to form a combined word signal indicative of a combined word;*

*an encrypter for encrypting the combined word signal to form an encrypted combined word signal; and*

*transmission means for transmitting a command signal including a key portion derived from the encrypted combined word signal; and*

*the receiving module comprising*

*reception means for receiving the command signal;*

*a decrypter for decrypting the key portion of the command signal to recover the combined word signal;*

*a second signal generator for providing at least one number signal; and*

*authentication means for providing an authentication signal only if at least a portion of said at least one number signal is identical to a corresponding portion of the recovered combined word signal.*

*48. A system according to claim 47 wherein*

*said at least one number signal comprises a second plurality of number signals indicative of respective pseudorandom numbers; and*

*the authentication means comprises means for providing an authentication signal only if at least a portion of each of the second plurality of number signals is identical to a corresponding portion of the recovered combined word signal.*

*49. A system according to claim 47 wherein the encrypter comprises means for performing a linear encryption operation.*

*50. A system according to claim 47 wherein the encrypter comprises means for performing a feedback shift operation.*

*51. A system according to claim 50 wherein the feedback shift operation is linear.*

*52. A system according to claim 51 wherein the linear feedback shift register operation employs a secret feedback mask.*

*53. A system according to claim 50 wherein the linear feedback shift register operation employs a secret feedback mask and the decrypter comprises means for performing a reverse CRC operation employing the same secret feedback mask as the CRC operation.*

*54. A system according to claim 53 wherein the linear feedback shift register operation comprises a number of iterations on the order of the degree of the combined word or more.*

*55. A cryptographically authenticated remote control system in which a command transmitting unit selectively causes a physical effect in a command receiving module rendered responsive thereto, comprising*

*means for providing a starting number signal in the transmitting unit and for providing the same starting number signal in the receiving module, the starting number signal indicative of a starting number; and*

*comprising in the transmitting unit*

*a first signal generator for providing a first iteration control signal which changes in a pseudorandom manner in response to successive transmissions from the transmitting unit;*

*a first signal processor for iterating a variable number of times an iterative encryption operation on the starting number signal, the variable number determined by the first iteration control signal, and for providing a first resulting signal therefrom;*

*transmission means for transmitting a command signal derived at least in part from the first resulting signal; and*

*comprising in the receiving module:*

*reception means for receiving the command signal;*

*a signal conditioner for recovering the first resulting signal from the command signal;*

*a second signal generator for providing a second iteration control signal which changes in the same pseudorandom manner as the first iteration control signal in response to successive receptions of command signals by the receiving module;*

*a second signal processor for iterating a variable number of times an iterative encryption operation on the starting number signal, the variable number determined by*

*the second iteration control signal, and for providing a second resulting signal therefrom;*

*comparison means for comparing at least a portion of the first resulting signal with a corresponding portion of the second resulting signal; and*

*authentication means for providing an authentication signal only if the portion of the first resulting signal is identical to the corresponding portion of the second resulting signal.*

*56. A system according to claim 55 wherein the iterative encryption operation comprises a linear iterative encryption operation.*

*57. A system according to claim 55 wherein the iterative encryption operation comprises a feedback shift register operation.*

*58. A system according to claim 57 wherein the feedback shift register operation is linear.*

*59. A system according to claim 58 wherein the linear feedback shift register operation employs a secret feedback mask.*

*60. A system according to claim 59 wherein the linear feedback shift register operation employs the same secret feedback mask in the transmitting unit as in the receiving module.*

*61. A system according to claim 55 further comprising means for providing a secret initial value signal in the transmitting unit and the same secret initial value signal in the receiving unit; and further wherein the starting number signal is indicative of a word derived at least in part from the secret initial value signal, and is formed at least in part from a number of iterations of an iterative encryption operation on the order of the degree of the word.*

*62. A system according to claim 55 wherein the variable number is a fraction of the degree of the starting number.*

*63. A system according to claim 55 comprising:*

*means for providing a second starting number signal in the transmitting unit and for providing the same second starting number signal in the receiving module, the starting number signal indicative of a starting number; and*

*comprising in the transmitting unit*

*a third signal generator for providing a third iteration control signal which changes in a pseudorandom fashion in response to successive transmissions from the transmitting unit;*

*a third signal processor for iterating a changeable number of times an iterative encryption process on the second starting number signal, the changeable number determined by the third iteration control signal, and for providing a third resulting signal therefrom;*

*transmission means for transmitting the command signal derived at least in part from the third resulting signal; and*

*comprising in the receiving module*

*fourth signal conditioning means for recovering the third resulting signal from the command signal;*

*a fourth signal generator for providing a fourth iteration control signal which changes in the same pseudorandom fashion as the third iteration control signal, in response to successive receptions of command signals by the receiving module;*

*a fourth signal processor for iterating a changeable number of times an iterative encryption operation on the starting number signal, the variable number determined by the fourth iteration control signal, and for providing a fourth resulting signal therefrom;*

*comparison means for comparing at least a portion of the third resulting signal with a corresponding protion of the fourth resulting signal; and*

*authentication means for providing an authentication signal only if the portion of the third resulting signal is identical to the corresponding portion of the fourth resulting signal.*

*64. A system according to claim 63 wherein the variable number is different from the changeable number.*

*65. A system according to claim 63 wherein the pseudorandom manner is different from the pseudorandom fashion.*

*66. A system according to claim 65 wherein the iterative encryption operation is the same as the iterative encryption process.*

*67. A system according to claim 55 wherein the iteration control signal changes in response to the value of a bit position of a changing number.*

*68. A system according to claim 67 wherein the changing number is the starting number.*

*69. A system according to claim 55 wherein the iteration control signal changes in response to the value of a plurality of bit positions of a changing number.*

*70. A system according to claim 69 wherein the changing number is the starting number.*

*71. A cryptographically authenticated remote control system in which any of a plurality of command transmitting units selectively causes a physical effect in a command receiving module rendered responsive thereto, comprising:*

*transmitter memory for storing a set of numbers in each of the transmitting units, each set corresponding to one of the transmitting units, each set including at least one secret initial value, each set essentially unique to the corresponding unit;*

*receiver memory for storing in the receiving module the set of numbers for each of the transmitters to which the receiving module is to respond;*

*transmission means for transmitting to the receiving module from one of the transmitting units a command word including a key portion derived at least in part from an encryption operation performed on the secret initial value; and*

*authentication means for authenticating the command word received at the receiving module utilizing the numbers in a corresponding set.*

*72. A system according to claim 71 wherein each set includes an identification number and the command word includes the identification number; and comprising authentication means for authenticating the command word received at the receiving modules utilizing the numbers in a corresponding set only in response to the command word containing an identification number which matches an identification number in one of the sets disposed in the receiving module.*

*73. A system according to claim 72 wherein the receiving module further comprises selection means for performing an authentication process using successive ones of the sets which have an identification number that matches the identification number included in the received command word until either authentication occurs or all of the sets have been used.*

*74. A system according to claim 71 wherein the receiving module further comprises selection means for performing an authentication process on the key portion using successive ones of the sets until either authentication occurs or all of the sets have been used.*

*75. A system according to claim 71 wherein each set includes at least one corresponding secret feedback mask,*

*and the encryption operation comprises a feedback shift register pseudorandom number generation operation using the secret feedback mask.*

*76. A system according to claim 75 wherein the feedback shift register operation is linear.*

*77. A synchronized cryptographic authenticated remote control system in which a command transmitting unit selectively causes a physical effect in a command receiving module rendered responsive thereto comprising:*

*transmission means for transmitting a command word including a key portion derived from at least one encrypted number generated in the transmitting unit and indicative of a command;*

*reception means for receiving the command word and, in response thereto, for comparing a number in the receiving module with a number decrypted from the key portion recovered from the command word;*

*authentication means for providing an authentication signal based at least in part on identity between the number in the receiving module and the number decrypted from the key portion recovered from the command word and for selectively performing the command indicated thereby in response to the authentication signal; and*

*deactivation means for rendering the receiving module unresponsive, following receipt of one command word, to receipt of an additional command word for a period of time on the order of one-half second, or more.*

*78. A system according to claim 77 wherein the period of time commences on the conclusion of receipt of one of the command words.*

*79. An authentication system for generating an authentication signal upon the identity between two signals comprising*

*first and second nonvolatile memory;*

*a starting number stored in each of first and second nonvolatile memory;*

*a first signal generator for providing a first iteration control signal which changes in a pseudorandom manner in response to successive operations of the authentication system;*

*a first signal processor coupled to the first nonvolatile memory for iterating a variable number of times an iterative encryption operation on the starting number, the variable number determined by the first iteration control signal, and for providing a first resulting signal therefrom;*

*reception means for receiving the first resulting signal;*

*a second signal generator for providing a second iteration control signal which changes in a pseudorandom manner in response to successive receptions of the first resulting signal;*

*a second signal processor coupled to the second nonvolatile memory for iterating a variable number of times an iterative encryption operation on the starting number, the variable number determined by the second iteration control signal, and for providing a second resulting signal therefrom;*

*comparison means for comparing at least a portion of the first resulting signal with a portion of the second resulting signal; and*

*authentication means for providing an authentication signal only if the portion of the first resulting signal is identical to the corresponding portion of the second resulting signal.*

*80. A system according to claim 79 wherein the iterative encryption operation comprises a linear iterative encryption operation.*

*81. A system according to claim 79 wherein the iterative encryption operation comprises a feedback shift register operation.*

*82. A system according to claim 81 wherein the feedback shift register operation is linear.*

*83. A system according to claim 82 wherein the linear feedback shift register operation employs a secret feedback mask.*

*84. A system according to claim 83 wherein the linear feedback shift register operation employs the same secret feedback mask in the transmitting unit as in the receiving module.*

*85. A system according to claim 79 further comprising means for providing a secret initial value signal in the transmitting unit and the same secret initial value signal in the receiving unit; and further wherein the starting number signal is indicative of a word derived at least in part from the secret initial value signal, and is formed at least in part from a number of iterations of an iterative encryption operation on the order of the degree of the word.*

*86. A system according to claim 79 wherein the variable number is a fraction of the degree of the starting number.*

*87. A remote control lock system comprising*

*a transmitter having*

*a first pseudorandom number generator for generating a first pseudorandom number, and a second pseudorandom number generator for generating a second pseudorandom number;*

*a first signal processor for concatenating the first and second pseudorandom numbers to form a combined word;*

*a plurality of command switches indicative of respective lock commands;*

*a second signal processor responsive to the plurality of command switches for generating a combined signal derived at least in part from the combined word and indicative of a lock command; and*

*transmission means for transmitting the combined signal to a receiver responsive thereto; and*

*a receiver having*

*recovery means for recovering the combined word and the lock command from the combined signal;*

*a third pseudorandom number generator for generating a third pseudorandom number and a fourth pseudorandom number generator for generating a fourth pseudorandom number;*

*a third signal processor for concatenating the third and fourth pseudorandom numbers to form an authentication word; and comparison means for comparing the combined word and the authentication word, for generating an authentication signal in response to identity therebetween, and for authorizing the performance of the lock command upon the generation of the authentication signal.*

*88. The system of claim 87 in which the first, second, third, and fourth pseudorandom number generators employ a feedback shift register.*

*89. A remote control lock system comprising a transmitter and a receiver, the transmitter comprising at least one transmitter register having a plurality of bit positions indicative of binary states, wherein the binary state of at least one of the bit positions determines the number of*

*iterations of an iterative encryption algorithm performed on the contents of the transmitter register.*

*90. The system of claim 89 wherein the receiver comprises at least one receiver register having a plurality of bit positions indicative of binary states, wherein the binary state of at least one of the bit positions determines the number of iterations of an iterative encryption algorithm performed on the contents of the receiver register; and*

*comparison means for comparing the contents of a number derived at least in part from the contents of the transmitter register with a number derived at least in part from the contents of the receiver register to provide an authentication signal upon identity therebetween.*

*91. The system of claim 90 wherein the iterative encryption algorithm is a feedback shift register algorithm.*

*92. The system of claim 91 wherein the feedback shift resister algorithm is linear.*

*93. The system of claim 92 comprising*

*command switches on the transmitter indicative of a plurality of lock related commands;*

*a signal processor responsive to the command switches for concatenating any one of the lock related commands with a number derived at least in part from the contents of the transmitter register; and*

*the comparison means comprising means for communicating a signal representative the lock related command from the transmitter to the receiver, and authorization means for authorizing performance of the lock related command on the condition that at least a portion of the contents of the transmitter register is identical to a corresponding portion of the contents of the receiver register.*

* * * * *